US005670580A

United States Patent [19]

Tazaki et al.

[11] Patent Number: 5,670,580
[45] Date of Patent: Sep. 23, 1997

[54] PROPYLENE BLOCK COPOLYMER, PROCESS FOR PREPARING SAME, AND MODIFIED COPOLYMER USING PROPYLENE BLOCK COPOLYMER

[75] Inventors: Toshinori Tazaki; Shuji Machida, both of Sodegaura, Japan

[73] Assignee: Idemitsu Kosan Co., Ltd., Tokyo, Japan

[21] Appl. No.: 507,233

[22] PCT Filed: Feb. 24, 1994

[86] PCT No.: PCT/JP94/00291

§ 371 Date: Aug. 23, 1995

§ 102(e) Date: Aug. 23, 1995

[87] PCT Pub. No.: WO94/19382

PCT Pub. Date: Sep. 1, 1994

[30] Foreign Application Priority Data

Feb. 24, 1993 [JP] Japan ..................... 5-035764

[51] Int. Cl.$^6$ .................. C08F 210/06; C08F 297/08
[52] U.S. Cl. .................. 525/240; 525/322; 525/323
[58] Field of Search ................ 525/240, 323, 525/322

[56] References Cited

U.S. PATENT DOCUMENTS 5,286,564  2/1994  Cecchin et al. ................ 428/402
5,476,903  12/1995  Shinozaki ..................... 525/232

FOREIGN PATENT DOCUMENTS 478 117  4/1992  European Pat. Off. .
477 662  4/1992  European Pat. Off. .

*Primary Examiner*—Irina S. Zemel
*Attorney, Agent, or Firm*—Oblon, Spivak, McClelland, Maier & Neustadt, P.C.

[57] ABSTRACT

There are here disclosed a propylene block copolymer comprising (A) 50 to 95 wt % of a specific propylene polymer block which contains a propylene unit or the propylene unit and 4 wt % or less of an olefin unit having 2 to 8 carbon atoms and (B) 50 to 5 wt % of an ethylene-propylene copolymer block containing 20 to 90 wt % of an ethylene unit, 0.001 to 15.0 wt % of a unit derived from a diolefin being contained in at least one of the components (A) and (B), a reduced viscosity at a concentration of 0.05 g/dl measured in decalin at 135° C. being in the range of 0.01 to 30 dl/g; its preparation process; a hydrogenated copolymer obtained from the propylene block copolymer; and a modified copolymer obtained by introducing a functional group into at least 5% of unsaturated bonds of the copolymer.

The above-mentioned copolymer can inhibit the formation of a gel, is excellent in balance between stiffness and impact resistance, has a good moldability, and possesses an unsaturated group useful for a modification reaction. In addition, the copolymer is excellent in adhesive properties, printability, hydrophilic nature, polymer modifying properties, antistatic properties and flame resistance.

20 Claims, No Drawings

PROPYLENE BLOCK COPOLYMER, PROCESS FOR PREPARING SAME, AND MODIFIED COPOLYMER USING PROPYLENE BLOCK COPOLYMER

TECHNICAL FIELD

The present invention relates to a novel propylene block copolymer, a process for preparing the same, a hydrogenated propylene block copolymer and a modified copolymer of the propylene block copolymer. More specifically, the present invention relates to a propylene block copolymer which is excellent in balance between stiffness and impact resistance, is free from the generation of a gel, can optionally control the activation energy of melt flow, has a good moldability, and possesses an unsaturated group useful for a chemical reaction such as a modification reaction or a graft reaction; a process for efficiently preparing the propylene block copolymer; a hydrogenated propylene block copolymer using the propylene block copolymer; and a modified copolymer which can be obtained by modifying the propylene block copolymer to introduce, into its reactive unsaturated group, a functional group such as a hydroxyl group, a carboxyl group, an epoxy group, a nitro group, an amino group, an acyl group, a sulfone group or a halogen group and which is excellent in adhesive properties, printability, hydrophilic nature, polymer modifying properties, antistatic properties and flame resistance.

BACKGROUND ART

In recent years, there has been a demand to decrease the wall thickness and to reduce the weight of injection-molded articles from the viewpoints of the saving resources and energy. Since an improvement in the balance between stiffness and impact resistance of a polypropylene permits a decrease in the wall thickness and reduction of the weight of the molded articles, various techniques have been suggested for the purpose of improving the physical properties of polypropylene. For example, there have been suggested Japanese Patent Application Laid-open Nos. 113695/1979, 5969/1980, 115417/1980, 69821/1986, 69822/1986 and 69823/1986. However, with regard to the balance between the stiffness and impact resistance, a further improvement has been desired.

Also for propylene polymers, resin designs have been made by imparting an additional property (particularly melt tension) thereto so as to sufficiently utilize characteristics peculiar to the propylene polymers, thereby developing the applications of the same. For example, in Japanese Patent Application Laid-open Nos. 185490/1993, 194659/1993, 194778/1993, 194793/1993, 200849/1993, 202137/1993, 202143/1993, 202219/1993, 202237/1993, 202238/1993, 202248/1993, 209062/1993, 212771/1993, 212774/1993, 214178/1993, 220829/1993, 222121/1993, 222122/1993, 222251/1993, 228995/1993, 237930/1993 and 239232/1993, techniques have been disclosed in which a preliminary polymerization catalyst is combined with a preliminary polymerization process to impart sufficiently improved melt tension to the propylene polymer and a resin composition containing this polymer. However, in the techniques disclosed in these publications, at least three preliminary polymerization steps are required prior to a main polymerization, which makes the operation complex. In addition, the reactivity of the polymerization is usually poor, and there is also a problem that a non-conjugated chain diene is used which tends to bring about cyclization or a crosslinking reaction in the reaction.

Moreover, the homopolymers and copolymers of propylene have excellent mechanical strength, gloss, transparency, moldability, moisture resistance and chemical resistance in addition to being inexpensive, and therefore they have widely been used for various applications in many fields. However, these propylene polymers, since having a non-polar molecular structure, are noticeably and inconveniently poor in compatibility with other substances, adhesive properties, coating properties, printability and antistatic properties.

In order to eliminate such drawbacks, for example, there have been suggested (1) a process of partially oxidizing the polymer by a treatment with a solution containing chromic acid or a flame treatment, (2) a process of graft-modifying the polymer with a polar group-containing compound such as maleic anhydride, methyl methacrylate or acrylonitrile in the presence of a radical generator, and (3) a process of copolymerizing the polymer with a polar group-containing comonomer. However, in the above-mentioned process (1), the treating agent is strongly acidic and poisonous, and because of difficult treatment conditions and a nonuniform effect, the industrial practice of this process is largely limited. The process (2) has partially been put to practical use, but the deterioration of the modified polymer and the decline in physical properties due to crosslinking cannot be avoided. Thus, in fact, this process cannot comply with use conditions and use morphologies which become more and more severe. In addition, the process (3) does not go beyond the level of a mere idea, and many problems must be solved for its practice.

For the purpose of solving such problems, various techniques have been suggested so far. For example, Japanese Patent Application Laid-open No. 85405/1986 has disclosed a process for copolymerizing propylene with a 1,4-diene. In this process, bifunctional olefins having different reactivities are used, whereby a copolymer having a 1,1-disubstituted olefin on a side chain (i.e., having a pendant olefin) can be prepared. However, this pendant olefin has a branched structure, and its use is inconveniently restrictive in a chemical reaction. For example, the graft reaction of the pendant olefin with a polar monomer or an olefin is extremely difficult. Furthermore, the copolymerizability between the olefin and the 1,4-diene is usually low, and therefore for the preparation of the unsaturated copolymer, it is necessary to use a large amount of the expensive 1,4-diene compound. Owing to the fact that a large amount of the 1,4-diene compound is required to be poured into the polymerization system, the productivity of the copolymer to the amount of a used catalyst (i.e., a catalytic activity) is low, so that the cost of the catalyst inconveniently tends to increase.

Also in "Polymer Bulletin", Vol. 10, p. 109 (1983), a similar polymerization method is described. This method has a feature that the possibility of a gelation reaction is relatively low, but in the case that an unsaturated group is contained in a high concentration, the undesirable gelation substantially occurs.

Furthermore, a method of copolymerizing an α-olefin with divinylbenzene is disclosed (Japanese Patent Application Laid-open Nos. 118510/1989 and 123811/1989). In this method, however, a crosslinking reaction occurs in the course of the copolymerization with the α-olefin, since divinylbenzene has double bonds of the same reactivity, and in consequence, the resultant product is inconveniently liable to become insoluble and infusible. Besides, the conversion of divinylbenzene into the copolymer is low, so that many divinylbenzene monomers remain in the copolymer, and hence, in the case that a graft reaction or a polymerization reaction is successively carried out, the removal of the monomers is necessary, which is troublesome in the preparation process. In addition, a pendant olefin becomes a styrene monomer, and its use is inconveniently restrictive in the graft reaction with an olefin.

Other copolymers of α-olefins and non-conjugated dienes are disclosed in detail in Japanese Patent Application Laid-open Nos. 269109/1990, 221508/1991 and 46909/1992. Furthermore, in Japanese Patent Application Laid-open Nos. 311507/1990 and 28706/1992, it has been described that the branched 1,4-diene is replaced with a branched 1,6-diene to solve some problems (the low copolymerizability, the cost increase in the comonomer and the generation of the gel at the copolymerization) which take place in the case that the 1,4-diene is used. However, there still remain several themes, for example, the improvement of the copolymerizability with an olefin, the prevention of the deterioration of a catalytic activity at polymerization, the inhibition of secondary reactions such as a cyclizing reaction and a crosslinking reaction on the chain of a produced polymer, and the enhancement of the efficiency of a polymerizing reaction using an unsaturated group on a side chain and a graft reaction.

It has been reported that when a ω-alkenylstyrene is used, for example, when o-allylstyrene is homopolymerized in the presence of a usual anionic polymerization catalyst or cationic polymerization catalyst in an o-allyl-styrene system described in "Polymer Chemistry", Vol. 29, No. 328, p. 593 (1972), the structure selectivity of the resultant homopolymer depends upon the kind of catalyst. However, it is difficult to prepare the olefin copolymer in the presence of such a catalytic system.

In Japanese Patent Application Laid-open No. 95303/1987, a similar copolymer is disclosed, but since obtained by a high-pressure radical polymerization, the copolymer is a long-chain branched polyethylene copolymer having a low density. Therefore, this copolymer has a drawback that strength and elasticity modulus are low. In addition, remaining double bonds are olefinic and hence they are only reactive with an olefin, so that the use of the copolymer is limited in graft modification. Thus, this copolymer inconveniently does not react with any polar vinyl monomer.

As is apparent from the foregoing, satisfactory products cannot be obtained by the conventional improvement techniques.

On the other hand, for modified olefin copolymers, many techniques have been suggested so far, and for example, in Japanese Patent Application Laid-open Nos. 85405/1986, 20504/1992, 20505/1992 and 20510/1992, techniques regarding the modified olefin copolymers have been disclosed. However, the patentability of these inventions principally resides in the preparation of a reactive precursor which can be used in a modification reaction, and the modification reaction itself is achieved by a combination of known techniques.

DISCLOSURE OF THE INVENTION

The present invention has been attained for the purposes of providing a propylene block copolymer which can overcome some drawbacks of conventional technique, can inhibit the generation of a gel by a crosslinking reaction or a cyclizing reaction, is excellent in balance between stiffness and impact resistance, can optionally control melt tension and the activation energy of melt flow, has a good moldability, and possesses an unsaturated group useful for a chemical reaction such as a graft reaction or a modification reaction; a process for efficiently preparing the propylene block copolymer; a propylene graft copolymer obtained by the use of the propylene block copolymer; a hydrogenated propylene block copolymer; a hydrogenated propylene graft copolymer; a process for efficiently preparing these copolymers; and a modified copolymer which can be obtained by modifying the propylene block copolymer and which is excellent in adhesive properties, printability, hydrophilic nature, polymer modifying properties, anti-static properties and flame resistance.

The present inventors have intensively researched to achieve the above-mentioned objects, and as a result, it has been found that a propylene block copolymer which comprises a specific propylene polymer block and a specific ethylene-propylene copolymer block in a specific ratio and in which a unit derived from a hydrocarbon having two unsaturated bonds is introduced into at least one block in a specific ratio can inhibit the generation of a gel, is excellent in balance between stiffness and impact resistance, has good moldability, and possesses unsaturated bonds on side chains useful to easily introduce a functional group by a chemical reaction such as a modification reaction.

Furthermore, it has also been found that when a catalytic system comprising the combination of a transition metal compound and a compound capable of reacting with the transition metal compound or its derivative to form an ionic complex is used in polymerizing the block component of a propylene polymer or the block component of an ethylene-propylene copolymer with a hydrocarbon compound having two unsaturated bonds, a block component having extremely good activity and random copolymerizability can be produced. Therefore, the amount of the unsaturated hydrocarbon compound which can be fed to the system at the time of the initiation of the polymerization can be decreased, and so the deterioration of polymerization activity by a catalyst poison and a crosslinking reaction or a cyclizing reaction can be avoided. As a result, the kinds of usable unsaturated hydrocarbon compounds can be increased.

It has further be found that a propylene block copolymer, which is substantially free from an unsaturated group and excellent in heat stability and which can optionally control the activation energy of melt flow, can be obtained by adding hydrogen to the above-mentioned propylene block copolymer in the presence of a hydrogenation catalyst.

It has also be found that a modified copolymer which is applicable to the above-mentioned object can be obtained by introducing a suitable functional group to unsaturated bonds on side chains of the above-mentioned propylene block copolymer (unhydrogenated). The present invention has been completed on the basis of these knowledges.

That is to say, according to the present invention, there can be provided a propylene block copolymer [1] comprising (A) 50 to 95 wt % of a propylene polymer block which contains a propylene unit or the propylene unit and 4 wt % or less of an olefin unit having 2 to 8 carbon atoms and in which the peak area of a peak observed between 21.0 and 22.0 ppm is 75 wt % or more of the peak area of peaks observed between 19.5 and 22.5 ppm attributable to a methyl group present on a side chain of a propylene chain by the use of tetramethylsilane as an internal standard in 1,2,4-trichlorobenzene in $^{13}$C-NMR measurement, and (B) 50 to 5 wt % of an ethylene-propylene copolymer block containing 20 to 90 wt % of an ethylene unit, a unit derived from a hydrocarbon compound having two unsaturated bonds being contained in a ratio of 0.001 to 15.0 wt % in at least one of the components (A) and (B), a reduced viscosity at a concentration of 6.05 g/dl measured in decalin at a temperature of 135° C. being in the range of 0.01 to 30 dl/g; a propylene block copolymer [2] substantially not containing the remaining unsaturated group which is obtained by subjecting the propylene block copolymer [1] to a hydrogenation treatment; and a modified copolymer [3] which is obtained by introducing a functional group to at least 5 mol % of unsaturated bonds present in the propylene block copolymer [1].

Furthermore, according to the present invention, there can be provided a process for preparing the above-mentioned propylene block copolymer [1] which uses a polymerization catalyst mainly comprising a transition metal compound and a compound capable of reacting with the transition metal compound or its derivative to form an ionic complex; a process for preparing the above-mentioned propylene block copolymer [1] which comprises the steps of carrying out the homopolymerization of propylene or the random copolymerization of propylene and an olefin having 2 to 8 carbon atoms until the amount of the resultant polymer is in the range of 50 to 90 wt % of the total block copolymer, and then doing the random copolymerization of (1) propylene, (2) a hydrocarbon compound having two unsaturated bonds of at least one kind selected from the group consisting of (a) a straight-chain non-conjugated diene compound represented by the general formula (I)

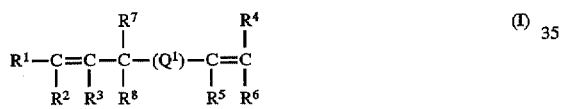

(I)

(wherein $R^1$ to $R^8$ are each a hydrogen atom or an alkyl group having 1 to 8 carbon atoms, and they may be the same or different, and $Q^1$ is an divalent organic group having 1 to 20 carbon atoms), (b) an aromatic diolefin compound represented by the general formula (II)

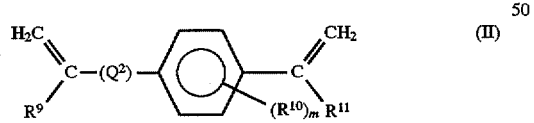

(II)

(wherein $R^9$, $R^{10}$ and $R^{11}$ are each a hydrogen atom, a halogen atom or an alkyl group having 1 to 8 carbon atoms, and they may be the same or different, $Q^2$ is an divalent organic group having 1 to 20 carbon atoms, and m is an integer of 1 to 4), and (c) a cyclic polyene having a norbornene skeleton represented by the general formula (III), (IV) or (V)

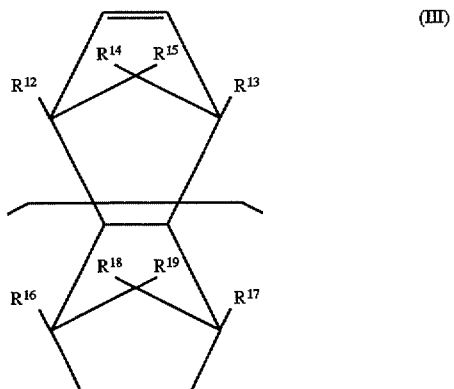

(III)

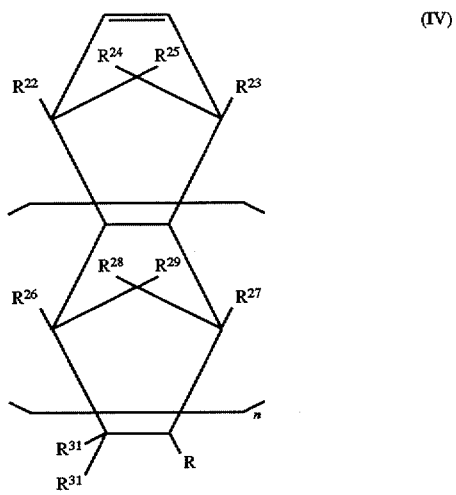

(IV)

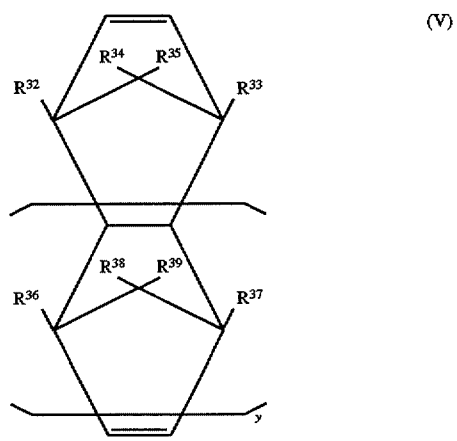

(V)

(wherein $R^{12}$ to $R^{39}$ are each a hydrogen atom, a halogen atom or a hydrocarbon group having 1 to 20 carbon atoms, and the respective groups of $R^{12}$ to $R^{21}$, $R^{22}$ to $R^{31}$, and $R^{32}$ to $R^{39}$ may be the same or different, R is an alkenyl group or an alkylidene group, and x, n and y are each an integer of 0 or more), and (3) ethylene; a process for preparing the above-mentioned propylene block copolymer [1] which comprises the steps of carrying out the random copolymerization of propylene and a hydrocarbon compound having two unsaturated bonds of at least one kind selected from the group consisting of compounds represented by the above-mentioned general formulae (I) to (V), or the random copolymerization of propylene, an olefin having 2 to 8 carbon atoms and a hydrocarbon compound having two unsaturated bonds of at least one kind selected from the group consisting of compounds represented by the above-mentioned general formulae (I) to (V) until the amount of the resultant random copolymer is in the range of 50 to 90 wt % of the total block copolymer, and then doing the random copolymerization of ethylene and propylene in the presence of the propylene copolymer; a process for preparing the above-mentioned propylene block copolymer [1] which comprises the steps of carrying out the random copolymerization of propylene and a hydrocarbon compound having two unsaturated bonds of at least one kind selected from the group consisting of compounds represented by the above-mentioned general formulae (I) to (V), or the random copolymerization of propylene, an olefin having 2 to 8 carbon atoms and a hydrocarbon compound having two unsaturated bonds of at least one kind selected from the group consisting of compounds represented by the above-mentioned general formulae (I) to (V) until the amount of the resultant random copolymer is in the range of 50 to 90 wt % of the total block copolymer, and then doing the random copolymerization of propylene, ethylene and a hydrocarbon compound having two unsaturated bonds of at least one kind selected from the group consisting of compounds represented by the above-mentioned general formulae (I) to (V) in the presence of the propylene copolymer; and a process for preparing the propylene block copolymer [2] which comprises hydrogenating the above-mentioned propylene block copolymer [1] in the presence of a hydrogenation catalyst.

BEST MODE FOR CARRYING OUT THE INVENTION

A propylene block copolymer [1] of the present invention substantially comprises (A) a component block (hereinafter referred to as "the block (A)" sometimes) and (B) a component block (hereinafter referred to as "the block (B)" sometimes), and has a reduced Viscosity of 0.01 to 30 dl/g at a concentration of 0.05 g/dl as measured in decalin at a temperature of 135° C. Here, the passage "substantially comprises the block (A) and the block (B)" means that at least one block (A) and at least one block (B) are present; that both the blocks may be in the state of a real "block copolymer" present on a unit polymer chain or may be in the state of a physical mixture of both the blocks formed by continuously performing polymerization steps for forming the blocks; and that a physical mixture of both the blocks and a third block or a third component other than both the blocks is not excluded.

In the typical or preferable propylene block copolymer [1], one block (A) and one block (B) are present as both the blocks. Such a typical copolymer can be obtained by first producing the block (A) and successively the block (B), and then, in the polymerization step, introducing, into the block (A), the block (B) or both of them, a unit derived from a hydrocarbon compound having two unsaturated bonds of at least one kind selected from the group consisting of compounds represented by the above-mentioned general formulae (I) to (V).

In the propylene block copolymer [1] of the present invention, the content of the block (A) is required to be in the range of 50 to 95 wt %, preferably 60 to 92 wt %, more preferably 65 to 90 wt % based on the total weight of the blocks (A) and (B). If the content of the block (A) is less than 50 wt %, stiffness is poor, and if it is more than 95 wt %, impact resistance deteriorates. The content of the block (B) is in the range of 5 to 50 wt %, preferably 8 to 40 wt %, more preferably 10 to 35 wt %.

The propylene block copolymer [1] of the present invention is required to possess a reduced viscosity of 0.01 to 30 dl/g, preferably 0.1 to 20 dl/g at a concentration of 0.05 g/dl as measured in decalin at a temperature of 135° C. If this reduced viscosity is less than 0.01 dl/g, mechanical strength is poor, and if it is more than 30 dl/g, moldability deteriorates.

In the propylene block copolymer [1], at least one of the blocks A and B contains 0.001 to 15.0 wt % of a unit derived from a hydrocarbon compound having two unsaturated bonds of at least one kind selected from the group consisting of compounds represented by the above-mentioned general formulae (I) to (V), and the relation between the content of this unit (DOU mol %) and the total amount of unsaturated groups observed in the copolymer (TUS mol %) usually meets the equation $$0.001 \leq TUS/DOU \leq 200.$$

In general, any insolubles are not observed in a decalin solution at a temperature of 135° C. Therefore, the unsaturated groups in this block copolymer are not consumed in a secondary reaction such as gelation or crosslinking, but they will play a role as reactive precursor groups which can be utilized in a graft reaction or a modification reaction.

The content of the unit (DOU mol %) derived from the hydrocarbon compound having two unsaturated bonds and the total amount of the unsaturated groups observed in the copolymer (TUS mol %) can be calculated as follows. In the first place, the DOU content can be calculated by the NMR analysis. On the other hand, with regard to the TUS content, in the case that the unsaturated group derived from the hydrocarbon compound having two unsaturated bonds is a vinyl group, this vinyl group can scarcely be discriminated from a vinyl group derived from an α-olefin produced at the terminal of the molecular chain, and thus, the sum of both the groups is first observed. In the case that the unsaturated group is not the vinyl group, the TUS content corresponds to the sum of the content of an unsaturated residue derived from the hydrocarbon compound having two unsaturated bonds and the content of the vinyl group derived from the α-olefin produced at the terminal of the molecular chain.

Here, the unsaturated groups, which correspond to the vinyl type unsaturated groups at the molecular terminal observed in the propylene block copolymer [1] of the present invention or the sum of this vinyl group and the vinyl group derived from the hydrocarbon compound having two unsaturated bonds, can easily be identified and determined by measuring the infrared absorption spectra of a pressed sheet formed at a temperature of 190° C.

| Kind of terminal unsaturated group | Position of absorption (cm$^{-1}$) |
| --- | --- |
| Vinylene group | 963 |
| Vinylidene group | 888 |
| Vinyl group | 907 |

In the propylene block copolymer [1] of the present invention, the propylene polymer block of the component (A) is (1) a propylene homopolymer, (2) a random copolymer comprising a propylene unit and 4 wt % or less of an olefin unit having 2 to 8 carbon atoms, (3) a random copolymer comprising the propylene unit and 0.001 to 15.0wt % of a unit derived from a hydrocarbon compound having two unsaturated bonds, or (4) a random copolymer comprising the propylene unit, 4 wt % or less of an olefin unit having 2 to 8 carbon atoms and 0.001 to 15.0 wt % of a unit derived from the hydrocarbon compound having two unsaturated bonds. Examples of the olefin having 2 to 8 carbon atoms include ethylene, 1-butene, 1-pentene, 1-hexene, 1-octene, 3-methylbutene-1, 4-methylpentene-1, 3-methylpentene-1, 3-methylhexene-1, 4-methylhexene-1 and 5-methylhexene-1, and above all, ethylene 1-butene 1-hexene and 1-octene are preferable, and ethylene is particularly suitable. These olefins may be used singly or in a combination of two or more thereof.

In the case that the above-mentioned olefin is used, the content of the olefin unit in the propylene polymer block is 4 wt % or less, preferably 2 wt % or less.

In this propylene polymer block of the component (A), the peak area of a peak observed between 21.0 to 22.0 ppm is 75 wt % or more, preferably 80 wt % or more, more preferably 85 wt % or more of the total peak area of peaks observed between 19.5 and 22.5 ppm attributable to a methyl group present on a side chain of a propylene chain by the use of tetramethylsilane as an internal standard in 1,2,4-trichlorobenzene in $^{13}$C-NMR measurement. That is to say, the propylene polymer block of the component (A) is a crystalline block component.

On the other hand, the ethylene-propylene copolymer block of the component (B) is (1) a random copolymer comprising 20 to 90 wt % of an ethylene unit and a propylene unit, or (2) a random copolymer comprising 20 to 90 wt % of an ethylene unit, 0.001 to 15.0 wt % of a unit derived from the hydrocarbon compound having two unsaturated bonds and a propylene unit. In this ethylene-propylene copolymer block, a part, e.g., 5.0 wt % or less of ethylene may be replaced with an α-olefin having 4 or more carbon atoms.

In the propylene block copolymer [1] of the present invention, at least one of the above-mentioned component blocks (A) and (B) is required to contain 0.001 to 15.0 wt % of a unit derived from the hydrocarbon compound having two unsaturated bonds.

Examples of the hydrocarbon compound having two unsaturated bonds include (a) a straight-chain non-conjugated diene compound represented by the general formula (I)

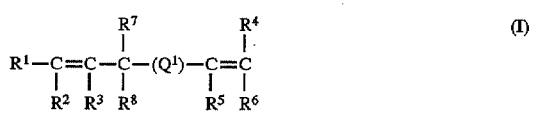

(wherein $R^1$ to $R^8$ and $Q^1$ are as defined above),
(b) an aromatic diolefin compound represented by the general formula (II)

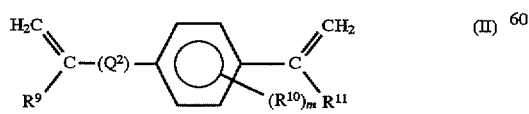

(wherein $R^9$, $R^{10}$, $R^{11}$, $Q^2$ and m are as defined above), and
(c) a cyclic polyene having a norbornene skeleton represented by the general formula (III), (IV) or (V)

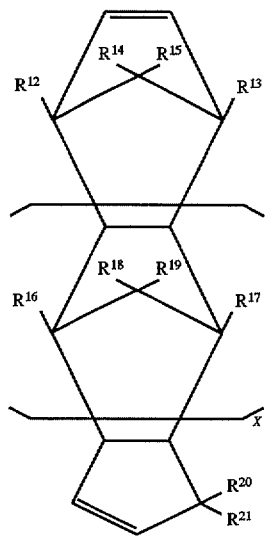

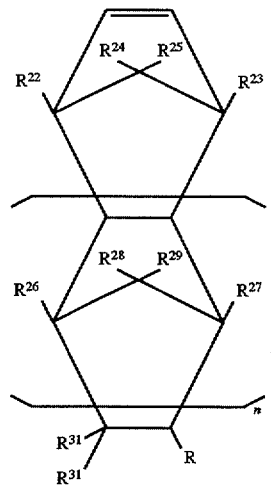

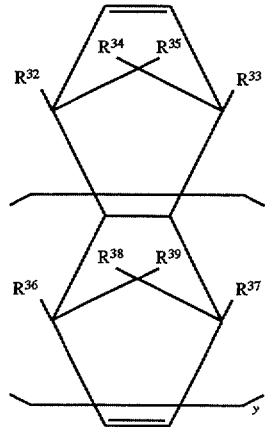

(wherein $R^{12}$ to $R^{39}$, R, x, n and y are as defined above).

Examples of the straight-chain non-conjugated diene compound represented by the general formula (I) include 1,4-dienes such as 4-methyl-1,4-hexadiene, 5-methyl-1,4-hexadiene, 4,5-dimethyl-1,4-hexadiene, 4-ethyl-1,4-hexadiene, 5-ethyl-1,4-hexadiene, 4,5-diethyl-1,4-hexadiene, 4-methyl-1,4-heptadiene, 5-methyl-1,4-heptadiene, 4,5-dimethyl-1,4-heptadiene, 4-ethyl-1,4-heptadiene, 5-ethyl-1,4-heptadiene, 4,5-diethyl-1,4-heptadiene, 4-methyl-1,4-octadiene, 5-methyl-1,4- octadiene, 4,5-dimethyl-1,4-octadiene, 4-ethyl-1,4-octadiene, 5-ethyl-1,4-octadiene, 4,5-diethyl-1,4-octadiene, 4-methyl-1,4-nonadiene, 5-methyl-1,4-nonadiene, 4,5-dimethyl-1,4-nonadiene, 4-ethyl-1,4-nonadiene, 5-ethyl-1,4-nonadiene and 4,5-diethyl-1,4-nonadiene; 1,5-dienes such as 5-methyl-1,5-heptadiene, 6-methyl-1,5-heptadiene, 5,6-dimethyl-1,5-heptadiene, 5-ethyl-1,5-heptadiene, 6-ethyl-1,5-heptadiene, 5,6-diethyl-1,5-heptadiene, 5-methyl-1,5-octadiene, 6-methyl-1,5-octadiene, 5,6-dimethyl-1,5-octadiene, 5-ethyl-1,5-octadiene, 6-ethyl-1,5-octadiene, 5,6-diethyl-1,5-octadiene, 5-methyl-1,5-nonadiene, 6-methyl-1,5-nonadiene, 5,6-dimethyl-1,5-nonadiene, 5-ethyl-1,5-nonadiene, 6-ethyl-1,5-nonadiene and 5,6-diethyl-1,5-nonadiene; 1,6-dienes such as 6-methyl-1,6-octadiene, 7-methyl-1,6-octadiene, 6,7-dimethyl-1,6-octadiene, 6-ethyl-1,6-octadiene, 7-ethyl-1,6-octadiene, 6,7-diethyl-1,6-octadiene, 6-methyl-1,6-nonadiene, 7-methyl-1,6-nonadiene, 6,7-dimethyl-1,6-nonadiene, 6-ethyl-1,6-nonadiene, 7-ethyl-1,6-nonadiene and 6,7-diethyl-1,6-nonadiene; 1,7-dienes such as 7-methyl-1,7-nonadiene, 8-methyl-1,7-nonadiene, 7,8-dimethyl-1,7-nonadiene, 7-ethyl-1,7-nonadiene, 8-ethyl-1,7-nonadiene and 7,8-diethyl-1,7-nonadiene; and 3-methyl-1,5-hexadiene, 3-ethyl-1,5-hexadiene, 3,4-dimethyl-1,5-hexadiene, 3-methyl-1,7-octadiene, 3-ethyl-1,7-octadiene, 3,4-dimethyl-1,7-octadiene and 3,5-dimethyl-1,7-octadiene. These straight-chain non-conjugated diene compounds may be used singly or in a combination of two or more thereof.

Examples of the aromatic diolefin compound represented by the general formula (II) include p-(2-propenyl)styrene, m-(2-propenyl)styrene, p-(3-butenyl)styrene, m-(3-butenyl)styrene, o-(3-butenyl)styrene, p-(4-pentenyl)styrene, m-(4-pentenyl)styrene, o-(4-pentenyl)styrene, p-(7-octenyl)styrene, p-(1-methyl-3-butenyl)styrene, p-(2-methyl-3-butenyl)styrene, m-(2-methyl-3-butenyl)styrene, o-(2-methyl-3-butenyl)styrene, p-(3-methyl-3-butenyl)styrene, p-(2-ethyl-3-butenyl)styrene, p-(2-ethyl-4-pentenyl)styrene, p-(3-butenyl)-α-methylstyrene, m-(3-butenyl)-α-methylstyrene and o-(3-butenyl)-α-methylstyrene. These aromatic diolefin compounds may be used singly or in a combination of two or more thereof.

Examples of the cyclic polyene having the norbornene skeleton represented by the general formula (III), (IV) or (V) include dicyclopentadiene, dimethyldicyclopentadiene, diethyldicyclopentadiene, 5-vinyl-2-norbornene, 5-allyl-2-norbornene, 5-propenyl-2-norbornene, 5-ethylidene-2-norbornene, norbornadiene and 5-methylnorbornadiene. These cyclic polyenes may be used singly or in a combination of two or more thereof.

Furthermore, in the present invention, the straight-chain non-conjugated diene compound, the aromatic diolefin compound and the cyclic polyene having the norbornene skeleton, when used, may suitably be combined.

If the diolefin compound represented by the formula (V) is copolymerized with propylene or three-dimensionally copolymerized with propylene-ethylene, the resultant block copolymer has the increased activation energy of melt flow sometimes. This fact can be considered to mean that the block copolymer contains a graft chain.

In the preparation of the propylene block copolymer [1] of the present invention, there is preferably used a polymerization catalyst mainly comprising a transition metal compound (d) and a compound (e) capable of reacting with the transition metal compound or its derivative to form an ionic complex.

As the transition metal compound of the component (d) in the catalyst, there can be used a transition metal compound containing a metal in the groups 3 to 10 of the periodic table or a metal of a lanthanide series. Preferable examples of the transition metal include titanium, zirconium, hafnium, chromium, manganese, nickel, palladium and platinum, and above all, zirconium, hafnium, nickel and palladium are particularly preferable.

Examples of such a transition metal compound includes various kinds of compounds, and in particular, compounds containing transition metals in the groups 4 and 8 to 10, above all, transition metals in the group 4 of the periodic table, i.e., titanium, zirconium and hafnium can be suitably used. Particularly suitable are compounds represented by the general formulae $$CpM^1R^{40}_aR^{41}_bR^{42}_c \qquad (VI)$$

$$Cp_2M^1R^{40}_aR^{41}_b \qquad (VII)$$

$$(Cp-A_e-Cp)M^1R^{40}_aR^{41}_b \qquad (VIII)$$

or the general formula $$M^1R^{40}_aR^{41}_bR^{42}_cR^{43}_d \qquad (IX)$$

and their derivatives.

In the above-mentioned general formulae (VI) to (IX), $M^1$ represents a transition metal in the group 4 of the periodic table such as titanium, zirconium or hafnium, and Cp represents a cyclic unsaturated hydrocarbon group or a chain unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group. In this connection, a part of the carbon atoms in the cyclopentadienyl group may be substituted by a hetero-atom such as nitrogen or phosphorus. $R^{40}$, $R^{41}$, $R^{42}$ and $R^{43}$ each independently represents a G-bond ligand, a chelate ligand or a ligand such as a Lewis base, and typical examples of the σ-bond ligand include a hydrogen atom, an oxygen atom, a halogen atom, an alkyl group having 1 to 20 carbon atoms, an alkoxy group having 1 to 20 carbon atoms, an aryl group, an alkylaryl group or an arylalkyl group having 6 to 20 carbon atoms, an acyloxy group having 1 to 20 carbon atoms, an allyl group, a substituted allyl group, and a substituent containing a silicon atom. In addition, examples of the thelate ligand include an acetylacetonato group and a substituted acetylacetonato group. A represents a crosslinkage by a covalent bond. a, b, c and d each is independently an integer of 0 to 4, and e is an integer of 0 to 6. Two or more of $R^{40}$, $R^{41}$, $R^{42}$ and $R^{43}$ may bond to each other to form a ring. In the case that the above-mentioned Cp has a substituent, this substituent is preferably an alkyl group having 1 to 20 carbon atoms. In the formulae (VII) and (VIII), the two Cps may be the same or different from each other.

Examples of the substituted cyclopentadienyl group in the above-mentioned formulae (VI) to (VIII) include a methylcyclopentadienyl group, an ethylcyclopentadienyl group, an isopropylcyclopentadienyl group, a 1,2-dimethylcyclopentadienyl group, a tetramethylcyclopentadienyl group, a 1,3-dimethylcyclopentadienyl group, a 1,2,3-trimethylcyclopentadienyl group, a 1,2,4-trimethylcyclopentadienyl group, a pentamethylcyclopentadienyl group and a trimethylsilylcyclopentadienyl group. Furthermore, typical examples of $R^{40}$ to $R^{43}$ in the above-mentioned formulae (VI) to (IX) include a fluorine atom, a chlorine atom, a bromine atom and an iodine atom as the halogen atoms; a methyl group, an ethyl group, an n-propyl group, an isopropyl group, an n-butyl group, an octyl group and a 2-ethylhexyl group as the alkyl groups having 1 to 20 carbon atoms; a methoxy group, an ethoxy group, a propoxy group, a butoxy group and a phenoxy group as the alkoxy groups having 1 to 20 carbon atoms; a phenyl group, a tolyl group, a xylyl group and a benzyl group as the aryl groups, the alkylaryl groups or the arylalkyl groups having 6 to 20 carbon atoms; a heptadecylcarbonyloxy group as the acyloxy group having 1 to 20 carbon atoms; a trimethylsilyl group and a (trimethylsilyl)methyl group as the substituent containing a silicon atom; and ethers such as dimethyl ether, diethyl ether and tetrahydrofuran, a thioether such as tetrahydrothiophene, an ester such as ethyl benzoate, nitriles such as acetonitrile and benzonitrile, amines such as trimethylamine, triethylamine, tributylamine, N,N-dimethylaniline, pyridine, 2,2'-bipyridine and phenanthroline, phosphines such as triethylphosphine and triphenylphosphine, chain unsaturated hydrocarbons such as ethylene, butadiene, 1-pentene, isoprene, pentadiene, 1-hexene and their derivatives, and cyclic unsaturated hydrocarbons such as benzene, toluene, xylene, cycloheptatriene, cyclooctadiene, cyclooctatriene, cyclooctatetraene and their derivatives as the Lewis base. In addition, examples of the crosslinkage by the covalent bond of A in the formula (VIII) include a methylene crosslinkage, a dimethylmethylene crosslinkage, an ethylene crosslinkage, a 1,1'-cyclohexylene crosslinkage, a dimethylsilylene crosslinkage, a dimethylgermilene crosslinkage and a dimethylstanilene crosslinkage.

Examples of the compound represented by the general formula (VI) include
(Pentamethylcyclopentadienyl)trimethylzirconium,
(Pentamethylcyclopentadienyl)triphenylzirconium,
(Pentamethylcyclopentadienyl)tribenzylzirconium,
(Pentamethylcyclopentadienyl)trichlorozirconium,
(Pentamethylcyclopentadienyl)trimethoxyzirconium,
(Pentamethylcyclopentadienyl)triethoxyzirconium,
(cyclopentadienyl)trimethylzirconium,
(cyclopentadienyl)triphenylzirconium,
(cyclopentadienyl)tribenzylzirconium,
(cyclopentadienyl)trichlorozirconium,
(cyclopentadienyl)trimethoxyzirconium,
(cyclopentadienyl)triethoxyzirconium,
(cyclopentadienyl)dimethyl(methoxy)zirconium,
(methylcyclopentadienyl)trimethylzirconium,
(methylcyclopentadienyl)triphenylzirconium,
(methylcyclopentadienyl)tribenzylzirconium,
(methylcyclopentadienyl)trichlorozirconium,
(methylcyclopentadienyl)dimethyl(methoxy)zirconium,
(dimethylcyclopentadienyl)trichlorozirconium,
(trimethylcyclopentadienyl)trichlorozirconium,
(trimethylcyclopentadienyl)trimethylzirconium,
(tetramethylcyclopentadienyl)trichlorozirconium, and these compounds in which zirconium is replaced with titanium or hafnium.

Examples of the compound represented by the general formulae (VII) include
bis(cyclopentadienyl)dimethylzirconium,
bis(cyclopentadienyl)diphenylzirconium,
bis(cyclopentadienyl)diethylzirconium,
bis(cyclopentadienyl)dibenzylzirconium,
bis(cyclopentadienyl)dimethoxyzirconium,
bis(cyclopentadienyl)dichlorozirconium,
bis(cyclopentadienyl)dihydridozirconium,
bis(cyclopentadienyl)monochloromonohydridozirconium,
bis(methylcyclopentadienyl)dimethylzirconium,
bis(methylcyclopentadienyl)dichlorozirconium,
bis(methylcyclopentadienyl)dibenzylzirconium,
bis(pentamethylcyclopentadienyl)dimethylzirconium,
bis(pentamethylcyclopentadienyl)dichlorozirconium,
bis(pentamethylcyclopentadienyl)dibenzylzirconium,
bis(pentamethylcyclopentadienyl)chloromethylzirconium,
bis(pentamethylcyclopentadienyl)hydridomethylzirconium,
(cyclopentadienyl)(pentamethylcyclopentadienyl)dichlorozirconium, and these compounds in which zirconium is replaced with titanium or hafnium.

Furthermore, examples of the compound represented by the general formula (VIII) include
ethylenebis(indenyl)dimethylzirconium,
ethylenebis(indenyl)dichlorozirconium,
ethylenebis(tetrahydroindenyl)dimethylzirconium,
ethylenebis(tetrahydroindenyl)dichlorozirconium,
dimethylsilylenebis(cyloropentadienyl)dimethylzirconium,
dimethylsilylenebis(cyloropentadienyl)dichlorozirconium,
isopropylidene(cyloropentadienyl)(9-fluorenyl)dimethylzirconium, isopropylidene(cyloropentadienyl)(9-fluorenyl)dichlorozirconium, [phenyl(methyl)methylene](9-fluorenyl)-(cycylopentadienyl)dimethylzirconium,
diphenylmethylene(cyclopentadienyl)(9-fluorenyl)dimethylzirconium, ethylene(9-fluorenyl)(cyclopentadienyl)dimethylzirconium, cyclohexylidene(9-fluorenyl)(cyclopentadienyl)dimethylzirconium,
cyclopentylidene(9-fluorenyl)(cyclopentadienyl)dimethylzirconium, cyclobutylidene(9-fluorenyl)(cyclopentadienyl)dimethylzirconium, dimethylsilylene(9-fluorenyl)(cyclopentadienyl)dimethylzirconium, dimethylsilylenebis(2,3,5-trimethylcyclopentadienyl)dichlorozirconium, dimethylsilylenebis(2,3,5-trimethylcyclopentadienyl)dimethylzirconium,
dimethylsilylenebis(indenyl)dichlorozirconium,
isopropylidenebis(cyclopentadienyl)dichlorozirconium and these compounds in which zirconium is replaced with titanium or hafnium.

Moreover, examples of the compound represented by the general formula (IX) include tetramethylzirconium, tetrabenzylzirconium, tetramethoxyzirconium, tetraethoxyzirconium, tetrabutoxyzirconium, tetrachlorozirconium, tetrabromozirconium, butoxytrichlorozirconium, dibutoxydichlorozirconium, tributoxychlorozirconium, bis(2,5-di-t-butylphenoxy)dimethylzirconium, bis(2,5-di-t-butylphenoxy)dichlorozirconium, zirconium bis(acetylacetonato), and these compounds in which zirconium is replaced with titanium or hafnium.

Furthermore, as the component (d), there can suitably be used a group 4 transition compound having, as the ligand, a multiple ligand compound in which in the above-mentioned general formula (VIII), two substituted or unsubstituted conjugated cyclopentadienyl groups (however, at least one of which is a substituted cyclopentadienyl group) are bonded to each other via an element selected from the group 14 of the periodic table.

An example of such a compound is a compound represented by the general formula (X)

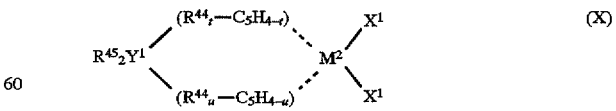

or its derivative.

In the above-mentioned general formula (X), $Y^1$ represents a carbon atom, a silicon atom, a germanium atom or a tin atom, $R^{44}_t$—$C_5H_{4-t}$ and $R^{44}_u$—$C_5H_{4-u}$ each represents a substituted cyclopentadienyl group, and t and u each is an integer of 1 to 4. Here, $R^{44}$s each represents a hydrogen atom, a silyl group or a hydrocarbon group, and they may be the same or different from each other. In at least one of the cyclopentadienyl groups, $R^{44}$ is present on at least one of carbon atoms adjacent to the carbon atom bonded to $Y^1$. $R^{45}$ represents a hydrogen atom, an alkyl group having 1 to 20 carbon atoms, or an aryl group, an alkylaryl group or an arylalkyl group having 6 to 20 carbon atoms. $M^2$ represents a titanium atom, a zirconium atom or a hafnium atom, $X^1$ represents a hydrogen atom, a halogen atom, an alkyl group having 1 to 20 carbon atoms, an aryl group, an alkylaryl group or an arylalkyl group having 6 to 20 carbon atoms, or an alkoxy group having 1 to 20 carbon atoms. $X^1$ may be the same or different from each other, and similarly, $R^{45}$s may be the same or different from each other.

Moreover, examples of the substituted cyclopentadienyl group in the general formula (X) include a methylcyclopentadienyl group, an ethylcyclopentadienyl group, an isopropylcyclopentadienyl group, a 1,2-dimethylcyclopentadienyl group, a 1,3-dimethylcyclopentadienyl group, a 1,2,3-trimethylcyclopentadienyl group and a 1,2,4-trimethylcyclopentadienyl group. Typical examples of $X^1$ include F, Cl, Br and I as the halogen atoms; a methyl group, an ethyl group, an n-propyl group, an isopropyl group, an n-butyl group, an octyl group and a 2-ethylhexyl group as the alkyl group having 1 to 20 carbon atoms; a methoxy group, an ethoxy group, a propoxy group, a butoxy group and a phenoxy group as the alkoxy groups having 1 to 20 carbon atoms; and a phenyl group, a tolyl group, a xylyl group and a benzyl group as the aryl group, the alkylaryl group or the arylalkyl group having 6 to 20 carbon atoms. Typical examples of the $R^{45}$ include a methyl group, an ethyl group, a phenyl group, a tolyl group, a xylyl group and a benzyl group.

Examples of the compound having the general formula (X) include dimethylsilylenebis(2,3,5-trimethylcyclopentadienyl)zirconium dichloride and this compound in which zirconium is replaced with titanium or hafnium.

In addition, the compound having the general formula (X) also includes compounds represented by the general formula (XI):

In the compound of the general formula (XI), Cp represents a cyclic unsaturated hydrocarbon group or a chain unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group. $M^3$ represents a titanium atom, a zirconium atom or a hafnium atom, $X^2$ represents a hydrogen atom, a halogen atom, an alkyl group having 1 to 20 carbon atoms, an aryl group, an alkylaryl group or an arylalkyl group having 6 to 20 carbon atoms, or an alkoxy group having 1 to 20 carbon atoms. Z represents $SiR^{46}_2$, $CR^{46}_2$, $SiR^{46}_2SiR^{46}_2$, $CR^{46}_2CR^{46}_2$, $CR^{46}_2CR^{46}_2CR^{46}_2$, $CR^{46}=CR^{46}$, $CR^{46}_2SiR^{46}_2$ or $GeR^{46}_2$, and $Y^2$ represents —N($R^{47}$)—, —O—, —S— or —P($R^{47}$)—. The above-mentioned $R^{46}$ is a group selected from the group consisting of a hydrogen atom, an alkyl group having 20 or less non-hydrogen atoms, an aryl group, a silyl group, a halogenated alkyl group, a halogenated aryl group and a combination thereof, and $R^{47}$ is an alkyl group having 1 to 10 carbon atoms or an aryl group having 6 to 10 carbon atoms, or $R^{47}$ may form a condensed ring of one or more $R^{46}$s and 30 or less non-hydrogen atoms. Moreover, w represents 1 or 2.

Typical examples of the compound represented by the general formula (XI) include (tert-butylamido)(tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)-methylenetitanium dichloride, (tert-butylamido)dimethyl(tetramethyl-$\eta^5$-cyclopentadienyl)silanetitanium dichloride, (tert-butylamido)dimethyl(tetramethyl-$\eta^5$-cyclopentadienyl)silanezirconium dibenzyl, (benzylamido)dimethyl(tetramethyl-$\eta^5$-cyclopentadienyl)silanetitanium dichloride and (phenylphosphide)dimethyl(tetramethyl-$\eta^5$-cyclopentadienyl)silanezirconium dibenzyl.

No particular restriction is put on the transition metal compounds containing transition metals in the groups 5 to 10, and typical examples of the chromium compound include tetramethylchromium, tetra(t-butoxy)chromium, bis(cyclopentadienyl)chromium, hydridotricarbonyl(cyclopentadienyl)chromium, hexacarbonyl(cyclopentadienyl)chromium, bis(benzene)chromium, tricarbonyltris(triphenyl sulfonate)chromium, tris(allyl)chromium, triphenyltris(tetrahydrofuran)chromium and chromium tris(acetylacetonate).

Typical examples of the manganese compound include tricarbonyl(cyclopentadienyl)manganese, pentacarbonylmethylmanganese, bis(cyclopentadienyl)manganese and manganese bis(acetylacetonate).

Typical examples of the nickel compound include dicarbonylbis(triphenylphosphine)nickel, dibromobis(triphenylphosphine)nickel, dinitrogenbis[bis(tricyclohexylphosphine)nickel], chlorohydridobis(tricyclohexylphosphine)nickel, chloro(phenyl)bis(triphenylphosphine)nickel, dimethylbis(trimethylphosphine)nickel, diethyl(2,2'-bipyridyl)nickel, bis(allyl)nickel, bis(cyclopentadienyl)nickel, bis(methylcyclopentadienyl)nickel, bis(pentamethylcyclopentadienyl)nickel, allyl(cyclopentadienyl)nickel, (cyclopentadienyl)(cyclooctadiene)nickel tetrafluoroborate, bis(cyclooctadiene)nickel, nickel bisacetylacetonate, allylnickel chloride, tetrakis(triphenylphosphine)nickel, nickel chloride and compounds represented by the formulae $(C_6H_5)Ni[OC(C_6H_5)CH=P(C_6H_5)_2][P(C_6H_5)_3]$ and $(C_6H_5)Ni[OC(C_6H_5)C(SO_3Na)=P(C_6H_5)_2][P(C_6H_5)_3]$.

Typical examples of the palladium compound include dichlorobis(benzonitrile)palladium, carbonyltris(triphenylphosphine)palladium, dichlorobis(triethylphosphine)palladium, bis(isocyanated t-butyl)palladium, palladium bis(acetylacetonate), dichloro(tetraphenylcyclobutadiene)palladium, dichloro(1,5-cyclooctadiene)palladium, aryl(cyclopentadienyl)palladium, bis(allyl)palladium, allyl(1,5-cyclooctadiene)palladium tetrafluoroborate, (acetylacetonato)(1,5-cyclooctadiene)palladium tetrafluoroborate and tetrakis(acetonitrile)palladium tetrafluoroborate.

In the polymerization catalyst which can be used in the present invention, the transition metal compounds which are the component (d) may be used singly or in a combination of two or more thereof, or these compounds which are modified with an electron donative compound can also be used.

On the other hand, examples of the compound, which can be used as the component (e) in the polymerization catalyst and which is capable of reacting with the transition metal compound of the above-mentioned component (d) or its derivative to form an ionic complex, include (e-1) an ionic compound capable of reacting with the transition metal compound of the component (d) to form an ionic complex, (e-2) an aluminoxane and (e-3) a Lewis acid.

As the component (e-1), any compound can be used, so far as it is an ionic compound capable of reacting with the transition metal compound of the component (d) to form an ionic complex, but compounds represented by the following general formulae (XII) and (XIII) can be suitably used:

  (XII)

or

  (XIII)

wherein $L^2$ is $M^5$, $R^{49}R^{50}M^6$, $R^{51}{}_3C$ or $R^{52}M^6$.

[In the formulae (XII) and (XIII), $L^1$ is a Lewis base; $[Z]^-$ is a non-coordinate anion $[Z^1]^-$ or $[Z^2]^-$ wherein $[Z^1]^-$ is an anion in which a plurality of groups are bonded to an element, i.e., $[M^4A^1A^2 \ldots A^n]^-$ (wherein $M^4$ is an element in the groups 5 to 15 of the periodic table, preferably an element in the groups 13 to 15 of the periodic table; $A^1$ to $A^n$ are each a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group or a heteroatom-containing hydrocarbon group having 2 to 20 carbon atoms, and two or more of $A^1$ to $A^n$ may form a ring; and n is an integer of [(a valence of the central metal $M^4$) +1]), and $[Z^2]^-$ is a Bransted acid alone in which a logarithm (pKa) of a reciprocal number of an acid dissociation constant is −10 or less, a conjugated base comprising the combination of the Bransted acid and a Lewis acid, or a conjugated base usually defined as an ultra-strong acid. Moreover, $[Z^2]^-$ may be coordinated with the Lewis acid. $R^{48}$ is a hydrogen atom, an alkyl group having 1 to 20 carbon atoms, or an aryl group, an alkylaryl group or an arylalkyl group having 6 to 20 carbon atoms; $R^{49}$ and $R^{50}$ are each a cyclopentadienyl group, a substituted cyclopentadienyl group, an indenyl group or a fluorenyl group; and $R^{51}$ is an alkyl group having 1 to 20 carbon atoms, an aryl group, an alkylaryl group or an arylalkyl group. $R^{52}$ is a large cyclic ligand such as tetraphenylporphyrin or phthalocyanine. k is an ion valence of $[L^1-R^{48}]$ or $[L^2]$ and it is an integer of 1 to 3; p is an integer of 1 or more; and q=(k×p). $M^5$ is an element in the groups 1 to 3, 11 to 13 and 17 of the periodic table; and $M^6$ is an element in the groups 7 to 12 of the periodic table.]

Here, typical examples of the Lewis base represented by the $L^1$ include ammonia, amines such as methylamine, aniline, dimethylamine, diethyiamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline, phosphines such as triethylphosphine, triphenylphosphine and diphenylphosphine, a thioether such as tetrahydrothiophene, an ester such as ethyl benzoate, and nitriles such as acetonitrile and benzonitrile.

Typical examples of $R^{48}$ include a hydrogen atom, a methyl group, an ethyl group, a benzyl group and a trityl group, and typical examples of $R^{48}$ and $R^{50}$ include a cyclopentadienyl group, a methylcyclopentadienyl group, an ethylcyclopentadienyl group and a pentamethylcyclopentadienyl group. Typical examples of $R^{51}$ include a phenyl group, a p-tolyl group and a p-methoxyphenyl group, and typical examples of $R^{52}$ include tetraphenylporphine, phthalocyanine, allyl and methallyl. In addition, typical examples of $M^5$ include Li, Na, K, Ag, Cu, Br, I and $I_3$, and typical examples of $M^6$ include Mn, Fe, Co, Ni and Zn.

In $[Z]^-$, i.e., $[M^4A^1A^2 \ldots A^n]^-$, typical examples of $M^4$ include B, Al, Si, P, As and Sb, and above all, B and Al are preferable Typical examples of $A^1$, $A^2$ to $A^n$ include dialkylamino groups such as a dimethylamino group and a diethylamino group; alkoxy groups or aryloxy groups such as a methoxy group, an ethoxy group, an n-butoxy group and a phenoxy group; hydrocarbon groups such as a methyl group, an ethyl group, an n-propyl group, an isopropyl group, an n-butyl group, an isobutyl group, an n-octyl group, an n-eicosyl group, a phenyl group, a p-tolyl group, a benzyl group, a 4-t-butylphenyl group and a 3,5-dimethylphenyl group; halogen atoms such as fluorine, chlorine, bromine and iodine; hetero-atom-containing hydrocarbon groups such as a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, a bis(trimethylsilyl)methyl group; and organic metalloid groups such as a pentamethylantimony group, a trimethylsilyl group, a trimethylgermyl group, a diphenylarsine group and a dicyclohexylantimony group.

Furthermore, examples of the non-coordinate anion, i.e., the Bransted acid alone in which the pKa is −10 or less, or the conjugated base $[Z^2]^-$ comprising the combination of the Brønsted acid and the Lewis acid include a trifluoromethane sulfonate anion $(CF_3SO_3)^-$, a bis(trifluoromethanesulfonyl) methyl anion, a bis(trifluoromethanesulfonyl)benzyl anion, a bis(trifluoromethanesulfonyl)amide, a perchlorate anion $(ClO_4)^-$, a trifluoroacetate anion $(CF_3CO_2)^-$, a hexafluoroantimony anion $(SbF_6)^-$, a fluorosulfonate anion $(FSO_3)^-$, a chlorosulfonate anion $(ClSO_3)^-$, a fluorosulfonate anion/antimony pentafluoride $(FSO_3/SbF_5)^-$, a fluorosulfonate anion/arsenic pentafluoride $(FSO_3/SbF_5)^-$ and a trifluoromethane sulfonate anion/antimony pentafluoride $(CF_3SO_3/SbF_5)^-$.

Typical examples of the ionic compound capable of reacting with the transition metal compound of the component (d) to form an ionic complex, i.e., the (e-1) component compound include triethylammonium tetraphenylborate, tri-n-butyl)ammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl) ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl) ammonium tetrakis(pentafluorophenyl)borate, methyldiphenylammonium tetrakis(pentafluorophenyl)borate, triphenyl (methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, (2-cyanopyridinium) tetrakis(pentafluorophenyl)borate, methyl(4-cyanopyridinium) tetrakis(pentafluorophenyl) borate, triphenylphosphonium tetrakis(pentafluorophenyl) borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl) borate, (1,1'-dimethylferrocenium) tetrakis (pentafluorophenyl)borate, decamethylferrocenium tetrakis (pentafluorophenyl)borate, siliver tetrakis (pentafluorophenyl)borate, trityl tetrakis(pentafluorophenyl) borate, lithium tetrakis(pentafluorophenyl)borate, sodium tetrakis(pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate and silver trifluoromethanesulfonate.

These ionic compounds capable of reacting with the transition metal compound of the component (d) to form an ionic complex, i.e., the (e-1) components may be used singly or in a combination of two or more thereof.

On the other hand, as the aluminoxane of the component (e-2), there can be mentioned a chain aluminoxane represented by the general formula (XIV)

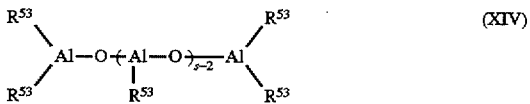

(wherein $R^{53}$s are each a halogen atom or a hydrocarbon group such as an alkyl group, an alkenyl group, an aryl group or an arylalkyl group having 1 to 20 carbon atoms, preferably 1 to 12 carbon atoms, and they may be the same or different; and s denotes a polymerization degree, and it is an integer of usually 3 to 50, preferably 7 to 40), and a cyclic aluminoxane represented by the general formula (XV)

(wherein $R^{53}$s and s are as defined above).

Among the compounds of the general formulae (XIV) and (XV), the aluminoxanes having a polymerization degree of 7 or more are preferable. In the case that the aluminoxane having a polymerization degree of 7 or more, or a mixture of these aluminoxanes is used, a high activation can be obtained. Furthermore, modified aluminoxanes can also suitably be used which can be obtained by modifying the aluminoxanes represented by the general formulae (XIV) and (XV) with a compound such as water having an active hydrogen and which are insoluble in usual solvents.

As a preparation method of the above-mentioned aluminoxane, a method can be mentioned in which an alkylaluminum is brought into contact with a condensation agent such as water, but no particular restriction is put on its means, and the reaction can be carried out in a known manner. For example, there are (1) a method which comprises dissolving an organic aluminum compound in an organic solvent, and then bringing the solution into contact with water, (2) a method which comprises first adding an organic aluminum compound at the time of polymerization, and then adding water, (3) a method which comprises reacting water of crystallization contained in a metallic salt or water adsorbed by an inorganic substance or an organic substance with an organic aluminum compound, and (4) a method which comprises reacting a tetraalkyldialuminoxane with a trialkylaluminum, and further reacting with water.

The aluminoxane may be insoluble in toluene.

These aluminoxanes may be used singly or in a combination of two or more thereof.

Furthermore, no particular restriction is put on the Lewis acid which is the component (e-3), and this Lewis acid may be an organic compound or a solid inorganic compound. As the organic compound, boron compounds and aluminum compounds are preferably used, and as the inorganic compound, magnesium compounds and aluminum compounds are preferably used. Examples of the aluminum compound include bis(2,6-di-t-butyl-4-methylphenoxy) aluminummethyl and (1,1-bi-2-naphthoxy) aluminummethyl, and examples of the magnesium compound include magnesium chloride and diethoxymagnesium. Examples of the aluminum compound include aluminum oxide and aluminum chloride, and examples of the boron compound include triphenylboron, tris(pentafluorophenyl)boron, tris[3,5-bis(trifluoromethyl) phenyl]boron, tris[(4-fluoromethyl)phenyl]boron, trimethylboron, triethylboron, tri-n-butylboron, tris (fluoromethyl)boron, tris(pentafluoroethyl)boron, tris (nonafluorobutyl)boron, tris(2,4,6-trifulorophenyl)boron, tris(3,5-difluoro)boron, tris[3,5-bis(trifluoromethyl)phenyl] boron, bis(pentafluorophenyl)fluoroboron, diphenylfluoroboron, bis(pentafluorophenyl)chloroboron, dimethylfluoroboron, diethylfluoroboron, di-n-butylfluoroboron, pentafluorophenyldifluoroboron, phenyldifluoroboron, pentafluorophenyldichloroboron, methyldifluoroboron, ethyldifluoroboron, n-butyldifluoroboron and boron trifluoride.

These Lewis acids may be used singly or in a combination of two or more thereof.

A molar ratio of the catalytic component (d) to the catalytic component (e) in the polymerization catalyst which can be used in the present invention is preferably in the range of 10:1 to 1:100, more preferably 2:1 to 1:10, most preferably 1:1 to 1:5 in the case that the compound (e-1) is used as the catalytic component (e); the molar ratio is preferably in the range of 1:20 to 1:10,000, more preferably 1:100 to 1:2,000 in the case that the compound (e-2) is used; and the molar ratio is preferably in the range of 10:1 to 1:2,000, more preferably 5:1 to 1:1,000, most preferably 2:1 to 1:500 in the case that the compound (e-3) is used.

The polymerization catalyst may comprise the above-mentioned component (d) and component (e) as the main components, or it may comprise the component (d), the component (e) and an organic aluminum compound (f).

Here, as the organic aluminum compound of the component (f), there can be used a compound represented by the general formula (XVI)

$$R^{54}{}_rAlQ_{3-r}$$ (XVI)

wherein $R^{54}$ is an alkyl group having 1 to 10 carbon atoms; Q is a hydrogen atom, an alkoxy group having 1 to 20 carbon atoms, an aryl group having 6 to 20 carbon atoms or a halogen atom; and r is an integer of 1 to 3.

Typical examples of the compound represented by the above-mentioned general formula (XVI) include trimethylaluminum, triethylaluminum triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

These organic aluminum compounds may be used singly or in a combination of two or more thereof.

A molar ratio of the catalytic component (d) to the catalytic component (f) is preferably in the range of 1:1 to 1:2,000, more preferably 1:5 to 1:1,000, most preferably 1:10 to 1:500. The employment of the catalytic component (f) permits the improvement in polymerization activity per transition metal, but if the catalytic component (f) is used in an excess amount, the organic aluminum compound is wasteful, and what is worse, it unpreferably remains in large quantities in the polymer.

In the present invention, at least one kind of catalytic component, when used, can be supported on a suitable carrier. No particular restriction is put on the kind of carrier, and all of inorganic oxide carriers, other inorganic carriers and organic carriers can be used, but the inorganic oxide carriers and the other inorganic carriers are particularly preferable.

Typical examples of the inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$ and mixtures thereof, for example, silica-alumina, zeolite, ferrite, sepiolite and glass fiber. Above all, $SiO_2$ and $Al_2O_3$ are particularly preferable. In this connection, the above-mentioned inorganic oxide carrier may contain a small amount of a carbonate, a nitrate, a sulfate or the like.

On the other hand, examples of the carriers other than mentioned above include magnesium compounds represented by the general formula $MgR^{55}{}_iX^3{}_j$, typified by magnesium compounds such as $MgCl_2$ and $Mg(OC_2H_5)_2$, and their complex salts. Here, $R^{55}$ represents an alkyl group having 1 to 20 carbon atoms, an alkoxy group having 1 to 20 carbon atoms or an aryl group having 6 to 20 carbon atoms; $X^3$ is a halogen atom or an alkyl group having 1 to 20 carbon atoms; i is 0 to 2; and j is 0 to 2 and i+j=2. $R^{55}$ and $X^3$ may be the same or different, respectively.

Furthermore, examples of the organic carriers include polymers such as polystyrenes, substituted polystyrenes, styrene-divinylbenzene copolymers, polyethylenes, polypropylenes and polyarylates, starch and carbon.

As the carrier which can be used in the present invention, $MgCl_2$, $MgCl(OC_2H_5)$, $Mg(OC_2H_5)_2$, $SiO_2$ and $Al_2O_3$ are preferable. The state of the carrier depends upon its kind and manufacturing process, but its average particle diameter is usually in the range of 1 to 300 μm, preferably 10 to 200 μm, more preferably 20 to 100 μm.

If the particle diameter is small, the fine power of the polymer increases, and if the particle diameter is large, the coarse particles of the polymer increase, which causes the deterioration of a bulk density and the clogging of a hopper.

Moreover, the specific surface area of the carrier is usually in the range of 1 to 1,000 $m^2/g$, preferably 50 to 500 $m^2/g$, and its pore volume is usually in the range of 0.1 to 5 $cm^3/g$, preferably 0.3 to 3 $cm^3/g$.

If either of the specific surface area and the pore volume deviates from the above-mentioned range, a catalyst activity deteriorates sometimes. In this connection, the specific surface area and the pore volume can be calculated from the volume of an adsorbed nitrogen gas in accordance with a BET method [refer to Journal of the American Chemical Society, Vol. 60, p. 309 (1983)].

Furthermore, it is desirable that the above-mentioned carrier, when used, is calcined usually at 150° to 1,000° C., preferably 200° to 800° C.

In the case that at least one of the catalystic components is supported on the above-mentioned carrier, at least one of the catalytic component (d) and the catalytic component (e) can be supported thereon, but it is preferable that both of the catalytic component (d) and the catalytic component (e) are supported thereon.

No particular restriction is put on a manner for supporting at least one of the catalytic components (d) and (e) on the carrier. For example, however, there can be employed (1) a manner of mixing at least one of the components (d) and (e) with the carrier, (2) a manner of treating the carrier with an organic aluminum compound or a halogen-containing silicon compound, and then mixing the treated carrier with at least one of the components (d) and (e), (3) a manner of reacting the carrier, one or both of the components (d) and (e), and the organic aluminum compound or the halogen-containing silicon compound, (4) a manner of supporting the component (d) or (e) on the carrier, and then mixing the carrier with the component (e) or (d), (5) a manner of mixing the carrier with a catalytic reaction product of the components (d) and (e), or (6) a manner of carrying out a catalytic reaction of the components (d) and (e) in the presence of the carrier.

In each reaction of the above-mentioned (4), (5) and (6), the organic aluminum compound of the component (f) can be added.

The thus obtained catalyst may be used for the polymerization after the used solvent has been distilled off to take out it in the form of a solid, or it may directly be used for the polymerization.

In the present invention, the catalyst can be formed by carrying out the operation of supporting at least one of components (d) and (e) on the support in the polymerization system. For example, there can be used a process which comprises adding at least one of components (d) and (e), the carrier and if necessary, the organic aluminum compound of the component (f) to the polymerization system, further adding the material monomers thereto at a pressure of atmospheric pressure to 20 $Kg/cm^2$, and then carrying out preliminary polymerization at −20° to 200° C. for an interval of about 1 minute to 2 hours to form the particles of the catalyst.

In the present invention, a weight ratio of the above-mentioned compound component (e-1) to the carrier is preferably in the range of 1:5 to 1:10,000, more preferably 1:10 to 1:500, and on the other hand, a weight ratio of the component (e-2) to the carrier is preferably in the range of 1:0.5 to 1:1,000, more preferably 1:1 to 1:50. Furthermore, a weight ratio of the component (e-3) to the carrier is preferably in the range of 1:5 to 1:10,000, more preferably 1:10 to 1:500. In addition, a weight ratio of the component (d) to the carrier is preferably in the range of 1:5 to 1:10,000, more preferably 1:10 to 1:500.

If the use ratio of the component (e) [the component (e-1), (e-2) or (e-3)] to the carrier, or the use ratio of the component (d) to the carrier deviates from the above-mentioned range, activity deteriorates on occasion. The average particle diameter of the thus prepared polymerization catalyst is usually in the range of 2 to 200 μm, preferably 10 to 150 μm, more preferably 20 to 100 μm. The specific surface area of the polymerization catalyst is usually in the range of 20 to 1,000 $m^2/g$, preferably 50 to 500 $m^2/g$. If the average particle diameter is less than 2 μm, fine powder in the polymer increases, and if it is more than 200 μm, coarse powder in the polymer increases on occasion. If the specific surface area is less than 20 $m^2/g$, the activity deteriorates sometimes, and if it is more than 1,000 $m^2/g$, the bulk density of the polymer deteriorates sometimes. In the catalyst, the amount of the transition metal in 100 g of the carrier is usually in the range of 0.05 to 10 g, preferably 0.1 to 2 g. If the amount of the transition metal is outside the above-mentioned range, the activity deteriorates on occasion.

When the catalytic component is supported on the carrier as described above, the polymer having the industrially advantageous bulk density and the excellent particle distribution can be obtained.

In the present invention, no particular restriction is put on the addition order of the respective catalytic components, and a ratio of the monomer to the catalyst is selected such that a molar ratio of the monomer/the transition metal is usually in the range of 10/1 to $10^9/1$, preferably $10^2/1$ to $10^7/1$.

As a copolymerization method, there can be used any of a slurry polymerization method, a solution polymerization method, a bulk polymerization method and a gaseous polymerization method, and any of a continuous polymerization process and a discontinuous polymerization process is acceptable. In the case of the solution polymerization method, a solvent can be used which is selected from the group consisting of aromatic hydrocarbons such as benzene, toluene, xylene and ethylbenzene, alicyclic hydrocarbons such as cyclopentane, cyclohexane and methylcyclohexane, and aliphatic hydrocarbons such as pentane, hexane, heptane and octane. In this case, monomer/the solvent (volume ratio) can optionally be selected.

The molecular weight and the composition of the copolymer to be obtained can be controlled by a usually usable technique. The control of the molecular weight can be carried out by regulating, for example, (1) the amount of hydrogen, (2) a temperature and (3) a monomer concentration. Furthermore, the control of the composition can be done by (1) the change of a monomer feed ratio and (2) the selection of the kind of catalyst.

As the preparation process of the propylene block copolymer [1] of the present invention, there can be used (1) a process which comprises carrying out the homopolymerization of propylene or the random copolymerization of propylene and an olefin having 2 to 8 carbon atoms until the amount of the resultant polymer is in the range of 50 to 90 wt % of the total block copolymer, and then doing, in the presence of the resultant propylene polymer, the random copolymerization of propylene, ethylene and a hydrocarbon compound having two unsaturated bonds of at least one kind selected from the group consisting of compounds represented by the above-mentioned general formulae (I) to (V); (2) a process which comprises carrying out the random copolymerization of propylene and a hydrocarbon compound having two unsaturated bonds of at least one kind selected from the group consisting of compounds represented by the above-mentioned general formulae (I) to (V), or the random copolymerization of propylene, an olefin having 2 to 8 carbon atoms and a hydrocarbon compound having two unsaturated bonds of at least one kind selected from the group consisting of compounds represented by the above-mentioned general formulae (I) to (V) until the amount of the resultant copolymer is in the range of 50 to 90 wt % of the total block copolymer, and then doing, in the presence of the resultant propylene copolymer, the random copolymerization of ethylene and propylene; or (3) a process which comprises carrying out the random copolymerization of propylene and a hydrocarbon compound having two unsaturated bonds of at least one kind selected from the group consisting of compounds represented by the above-mentioned general formulae (I) to (V), or the random copolymerization of propylene, an olefin having 2 to 8 carbon atoms and a hydrocarbon compound having two unsaturated bonds of at least one kind selected from the group consisting of compounds represented by the above-mentioned general formulae (I) to (V) until the amount of the resultant copolymer is in the range of 50 to 90 wt % of the total block copolymer, and then doing, in the presence of the resultant propylene copolymer, the random copolymerization of propylene, ethylene and a hydrocarbon compound having two unsaturated bonds of at least one kind selected from the group consisting of compounds represented by the above-mentioned general formulae (I) to (V). Needless to say, these processes are not restrictive.

Polymerization temperature is usually in the range of −100° to 200° C., preferably −50° to 100° C., more preferably 0° to 100° C., and polymerization pressure is usually in the range of atmospheric pressure to 100 kg/cm$^2$, preferably atmospheric pressure to 50 kg/cm$^2$, more preferably atmospheric pressure to 20 kg/cm$^2$.

The present invention can also provide a propylene graft copolymer [2] produced by graft-polymerizing an olefin on the thus obtained propylene block copolymer [1] having a reactive unsaturated group. In this graft polymerization, the same polymerization catalyst as used in the preparation of the propylene block copolymer [1] can be utilized as a catalyst. In this case, it is desirable to select and use the polymerization catalyst by which any double bond is not formed at a terminal. Incidentally, when the propylene block copolymer [1] obtained in the polymerization step is successively subjected to the graft polymerization without being separated, the polymerization catalyst does not have to be further added in the graft polymerization step.

The present invention can also provide a propylene block copolymer [3] and a propylene graft copolymer [4] substantially not having a remaining unsaturated group which can be produced by subjecting the propylene block copolymer [1] and the propylene graft copolymer [2]. In this case, the same polymerization catalyst as used in the preparation of the propylene block copolymer [1] can be utilized as a hydrogenation catalyst. Incidentally, when the propylene block copolymer [1] or the propylene graft copolymer [2] obtained in the polymerization step is successively subjected to the hydrogenation without being separated, any additional catalytic component is not particularly required in the hydrogenation step.

No particular restriction is put on the kind of hydrogenation catalyst which can be used in this hydrogenation, and there can be employed the catalysts previously mentioned in detail and catalysts which can usually be used at the time of the hydrogenation of an olefin compound. For example, the following catalysts can be mentioned.

Examples of a heterogeneous catalyst include nickel, palladium and platinum as well as solid catalysts obtained by supporting these metals on carriers such as carbon, silica, diatomaceous earth, alumina and titanium oxide, for example, nickel-silica, nickel-diatomaceous earth, palladium-carbon, palladium-silica, palladium-diatomaceous earth and palladium-alumina. Examples of the nickel catalyst include Raney nickel catalysts, and examples of the platinum catalyst include a platinum oxide catalyst and platinum black. Examples of a homogeneous catalyst include catalysts containing metals in the groups 8 to 10 of the periodic table as basic components, for example, catalysts comprising Ni and Co compounds and organic metallic compounds of metals selected from the groups 1, 2 and 3 of the periodic table such as cobalt naphthenate-triethylaluminum, cobalt octenoate-n-butyl-lithium and nickel acetylacetonato-triethylaluminum, and Rh compounds.

In addition, Ziegler hydrogenation catalysts disclosed by M. S. Saloan et al. [J. Am. Chem. Soc., 85, p. 4014 (1983)]

can also effectively used. Examples of these catalysts include the following compounds.

Ti(O—iC$_3$H$_7$)$_4$—(iC$_4$H$_9$)$_3$Al,
Ti(O—iC$_3$H$_7$)$_4$—(C$_2$H$_5$)$_3$Al,
(C$_2$H$_5$)$_2$TiCl$_2$—(C$_2$H$_5$)$_3$Al,
Cr(acac)$_3$—(C$_2$H$_5$)$_3$Al (wherein acac represents acetylacetonato), Na(acac)—(iC$_4$H$_9$)$_3$Al,
Mn(acaC)$_3$—(C$_2$H$_5$)$_3$Al,
Fe(acac)$_3$—(C$_2$H$_5$)$_3$Al,
Ca(acac)$_2$—(C$_2$H$_5$)$_3$Al, and
(C$_7$H$_5$COO)$_3$Co—(C$_2$H$_5$)$_3$Al.

The amount of the catalyst to be used in the hydrogenation step is suitably selected so that a molar ratio of the remaining unsaturated groups to the hydrogenation catalyst component in the block copolymer [1] or the graft copolymer [2] may be in the range of 10$^7$:1 to 10:1, preferably 10$^6$:1 to 10$^2$:1.

Furthermore, the charge pressure of hydrogen is suitably in the range of from atmospheric pressure to 50 kg/cm$^2$G. Besides, a reaction temperature is preferably on a higher side in the range in which the propylene block copolymer [1] or the propylene graft copolymer [2] does not decompose, and it is usually selected in the range of −100° to 300° C., preferably −50° to 200° C., more preferably 10° to 180° C.

In the preferable copolymers of the propylene block copolymer [1], the propylene graft copolymer [2], the hydrogenated propylene block copolymer [3] and the hydrogenated propylene graft copolymer [4], the content of a unit derived from propylene is in the range of 50 to 95 mol %, crystallization enthalpy is 10 J/g or more, and the activation energy of melt flow (Ea) is in the range of 8.0 to 27 kcal/mol.

These propylene copolymers have the sufficiently improved activation energy of the melt flow (Ea) as compared with a propylene homopolymer having a substantially equal weight-average molecular weight, and they are also excellent in workability. In the desirable propylene copolymers, Ea is in the range of 8.5 to 25.0 kcal/mol, preferably 9.0 to 22.0 kcal/mol.

The propylene block copolymer [1] and the hydrogenated propylene block copolymer [2] of the present invention can each be mixed with another thermoplastic resin. Examples of the other thermoplastic resin include polyolefin resins, polystyrene resins, condensation polymers and addition polymers. Typical examples of the polyolefin resins include high-density polyethylenes, low-density polyethylenes, poly(3-methylbutene-1), poly(4-methylpentene-1), straight-chain low-density polyethylenes obtained by the use of 1-butene, 1-hexene, 1-octene, 4-methylpentene-1, 3-methylbutene-1 and the like as comonomer components, ethylene-vinyl acetate copolymer, saponified ethylene-vinyl acetate copolymer, ethylene-acrylic acid copolymer, ethylene-acryl acid ester copolymers, ethylenic ionomers and polypropylenes. Typical examples of the polystyrene resins include general-purpose polystyrene, isotactic polystyrene and high-impact polystyrene (rubber modified). Typical examples of the condensation polymers include polyacetal resins, polycarbonate resins, polyamide resins such as 6-nylon and 6,6-nylon, polyester resins such as polyethylene terephthalate and polybutylene terephthalate, polyphenylene oxide resins, polyimide resins, polysulfone resins, polyether sulfone resins and polyphenylene sulfide resins. Examples of the addition polymers include polymers obtained from polar vinyl monomers, polymers obtained from diene monomers, and their typical examples include polymethyl methacrylate, polyacrylonitrile, acrylonitrile-butadiene copolymer, acrylonitrile-butadienestyrene copolymer, diene polymers obtained by hydrogenating diene chains, and thermoplastic elastomers. Of these thermoplastic resins, the polyolefin resins are preferable.

In the present invention, the above-mentioned propylene block copolymer [1] having a reactive unsaturated group is modified to introduce a functional group such as a hydroxyl group, a carboxyl group, an epoxy group, a halogen group, a nitro group, an amino group, an acyl group or a sulfone group into at least 5% of the unsaturated bonds of the copolymer.

In the present invention, the introduction of the above-mentioned functional group into the unsaturated bond means that the functional group is induced by the utilization of the unsaturated bond. Thus, the unsaturated bond can be modified to form a functional group, or a desired functional group can be introduced by linking a compound having the functional group to the unsaturated bond. No particular restriction is put on the manner of this introduction, and the introduction may be carried out not only in a liquid state but also in a melting state.

The amount of the functional group is 5 mol %, preferably 10 mol %, more preferably 15 mol %, most preferably 20 mol % of the unsaturated bond in the unsaturated copolymer. If the amount of the introduced functional group is less than 5 mol %, the content of the functional group is so low that a modification effect cannot be sufficiently exerted.

For the introduction of the functional group, various manners can be used. Next, the introduction methods of the various functional groups will be described.

(i) Introduction of the hydroxyl group

No particular restriction is put on the method for introducing the hydroxyl group into the propylene block copolymer [1] having a reactive unsaturated group, but the hydroxyl group introduction techniques can be roughly classified into a method which comprises the oxidation of the unsaturated bond, a method which comprises the addition reaction of a compound having one or more hydroxyl groups in its molecule to the unsaturated bond, and another method.

Examples of the method which comprises the oxidation of the unsaturated bond include (1) oxidation via the formation of a peracid by aqueous hydrogen peroxide and an organic acid such as formic acid, (2) oxidation with a permanganate in the presence or absence of a correlation moving catalyst such as a quaternary ammonium salt, (3) oxidation with aqueous hydrogen peroxide, a permanganate or the like in the presence of an oxide of osmium, ruthenium, tungsten, selenium or the like as a catalyst, (4) the hydrolysis of an adduct of a halogen such as bromine or a hydrogen halide, or an adduct of sulfuric acid, (5) the hydrolysis of an epoxy group introduced by a certain reaction.

On the other hand, the compound having one or more hydroxyl groups in its molecule has an active hydrogen atom capable of carrying out an addition reaction, particularly a Michel type addition reaction to the unsaturated bond (inclusive of a compound having two or more hydroxyl groups whose one can be utilized for the addition reaction). Typical examples of the compound having one or more hydroxyl groups include thiol compounds such as thioglycerol and thioglycol. The hydroxyl group can also be introduced by the addition reaction of an aldehyde which is known as the Prins reaction, an oxidation reaction subsequent to hydroboration, or a demercury reaction subsequent to oxymercury formation with mercuric acetate or the like.

(ii) Introduction of the carboxyl group

No particular restriction is put on the introduction method of the carboxyl group, but the carboxyl group introduction techniques can be roughly classified into a method comprising the oxidation of the unsaturated bond, a method comprising the addition reaction of a compound having one or more carboxyl groups in its molecule to the unsaturated bond, and another method.

A typical example of the carboxyl group introduction method is a method for introducing the carboxyl group via acylation by (1) oxidation with a hydroxylation agent (potassium permanganate), (2) hydrolysis after a reaction with a radical reaction agent (maleic anhydride or the like), or (3) a demetallizing reaction after a reaction with a metallizing agent (e.g., an alkyllithium).

(iii) Introduction of the epoxy group

No particular restriction is put on a method for introducing the epoxy group into the propylene block copolymer [1] having a reactive unsaturated group, but the epoxy group introduction techniques can be roughly classified into a method comprising the oxidation of the unsaturated bond, a method comprising the addition reaction of a compound having one or more epoxy groups in its molecule to the unsaturated bond, and another method.

Examples of the method comprising the oxidation of the unsaturated bond include (1) oxidation with a peracid such as performic acid, peracetic acid or perbenzoic acid, (2) oxidation with sodium hypochlorite in the presence or absence of a metallic porphyrin complex such as a manganese porphyrin complex, (3) oxidation with hydrogen peroxide or a hydroperoxide in the presence or absence of a catalyst such as a vanadium compound, a tungsten compound or a molybdenum compound, (4) oxidation with an alkaline hydrogen peroxide, and (5) the neutralization of an adduct with an alkali in an acetic acid-t-butyl hypochlorite system.

On the other hand, the compound having one or more epoxy groups in its molecule has an active hydrogen atom capable of carrying out an addition reaction, particularly a Michel type addition reaction to the unsaturated bond, and typical examples of the compound having one or more epoxy groups include thiol compounds such as thioglycidol and glycidyl thioglycollate.

(iv) Introduction of the nitro group or amino group

No particular restriction is put on a method for introducing the nitro group into the propylene block copolymer [1] having a reactive unsaturated group, but a desired product can easily be obtained in a high yield by treating the propylene block copolymer [1] with a usual nitrating agent (e.g., fuming nitric acid, a mixed acid or acetyl nitrate).

Furthermore, the introduction of the amino group can be accomplished by reducing a nitro compound.

(v) Introduction of the acyl group

No particular restriction is put on a method for introducing the acyl group, but for example, by treating the propylene block copolymer [1] with a reacting agent comprising aluminum chloride, acetyl chloride and carbon disulfide, the acyl group can be introduced in a good yield.

(iv) Introduction of the sulfone group

No particular restriction is put on a method for introducing the sulfone group, but for example, by the use of anhydrous sulfuric acid, fuming sulfuric acid, concentrated sulfuric acid or chlorosulfonic acid as a sulfonating agent, the sulfone group can easily be introduced in a good yield.

The reaction can be carried out while the propylene block copolymer [1] is swelled or dissolved in a solvent or it is molten, but preferably the reaction is done while it is dissolved or molten. In the case that the solvent is used, the solvent can suitably be selected in consideration of the kind of reaction. Examples of the solvent include aliphatic, alicyclic and aromatic hydrocarbons, their halides, esters, ketones and ethers having 6 or more carbon atoms, and carbon disulfide. These solvents may be used singly or in a combination of two or more thereof. Moreover, the selectivity of the reaction does not have to be always 100%, and by-products obtained by secondary reactions may be mixed, so far as the halogen is substantially introduced.

(vi) Introduction of the halogen

No particular restriction is put on a method for introducing the halogen into the propylene block copolymer [1] having a reactive unsaturated group, but for example, the halogen can be introduced by adding a hydrogen halide or the halogen to the unsaturated bond in accordance with a usual manner. Examples of the hydrogen halide include hydrogen chloride, hydrogen bromide and hydrogen iodide, and above all, hydrogen bromide and hydrogen iodide are preferable. Examples of the halogen include chlorine, bromine, iodine, bromine monochloride, iodine monochloride and iodine monobromide, and above all, bromine, bromine monochloride and iodine monochloride.

The amount of the halogen to be introduced is such that the halogen content in the propylene block copolymer [1] is 0.05 wt % or more, preferably 0.5 wt % or more, more preferably 1 wt % or more. If the halogen content is less than 0.05 wt %, the halogen content is so low that a halogen modification effect cannot be sufficiently exerted.

The selectivity of the reaction does not have to be always 100%, and by-products obtained by secondary reactions may be mixed, so far as the halogen is substantially introduced.

Furthermore, as the method for introducing the functional group, there can be suitably used (1) a method which comprises subjecting the propylene block copolymer [1] having a reactive unsaturated group to a telomerization reaction, or (2) a method which comprises reacting a radical-polymerizable monomer with the propylene block copolymer [1] at a temperature higher than the ceiling temperature of this monomer.

The modification method (1) by the utilization of the above-mentioned telomerization reaction comprises reacting at least one selected from the group consisting of suitable telogens with the propylene block copolymer [1] having a reactive unsaturated group in the presence of a suitable initiator to modify the propylene block copolymer. The kinds of telomerization reaction can be classified into a radical, a cationic and an anionic telomerization reaction.

The modification techniques by the utilization of the above-mentioned telomerization reaction (1) include a solution method in which this reaction is carried out in a solvent and another method in which melting and kneading are carried out by the use of an extruder or the like.

On the other hand, in the above-mentioned method (2), the radical-polymerizable monomer is reacted with the propylene block copolymer [1] at a temperature higher than the ceiling temperature of this monomer to modify the copolymer [1]. Here, the ceiling temperature means a temperature at which a growth reaction rate of from the monomer to the polymer is equal to a reverse growth reaction rate of a reverse reaction, and at temperatures higher than this ceiling temperature, the monomer does not perform the chain growth any more. Therefore, the reaction is carried out at either lower temperature of a boiling point and a decomposition temperature above the ceiling temperature of the monomer which is used for the modification, thereby modifying the propylene block copolymer [1].

In this modification reaction, a radical initiator such as an organic peroxide, an azo compound or a redox initiator can usually be used. The modification reaction may be carried out by using one of the solution method in which it is done in a solvent and the other method in which melting and kneading are carried out by the use of an extruder or the like. The kind of monomer which can be used in this case depends upon a set reaction temperature and the ceiling temperature of the monomer [which is described in Polymer Handbook]. This reaction temperature is preferably set to a temperature lower than the decomposition temperature of the selected monomer, preferably a temperature 10° C. lower than the decomposition temperature, more preferably a temperature 20° C. lower than the decomposition temperature.

Next, the present invention will be described in more detail with reference to examples, but the scope of the present invention should not be limited to these examples at all.

In this connection, a melting point (Tm) and the activation energy of melt flow (Ea) were determined as follows.

(1) Melting point (Tm)

The melting point was measured in accordance with the following procedure by the use of a differential scanning calorimeter DSC7 made by Perkin Elmer Co., Ltd. That is to say, there was measured an endothermic peak of fusion observed at a time when a sheet pressed at 190° C. was molten at 150° C. for 5 minutes, cooled to −50° C. at a rate of 10° C./min, and then heated at a rate of 10° C./min.

(2) Activation energy of melt flow (Ea)

The activation energy (Ea) of melt flow was measured in accordance with the following procedure by the use of a device RMS E-605 made by Rheometrics Co., Ltd. That is to say, frequency dependences ($10^{-2}$ to $10^2$ rad/sec) of dynamic viscoelastic properties were measured at measurement temperatures of 150° C., 170° C., 190° C., 210° C. and 230° C., and the activation energy (Ea) was then calculated on the basis of the shift factors of G', G" at the respective temperatures and the reciprocal number of an absolute temperature in accordance with the Arrhenius' equation by the use of a temperature-time conversion rule in which 170° C. was used as a standard temperature.

Preparation Example 1

Preparation of methylaluminoxane

In a 500-ml glass container which had been purged with argon were placed 200 ml of toluene, 17.8 g (71 mmols) of copper sulfate pentahydrate ($CuSO_4 \cdot 5H_2O$) and 24 ml (250 mmols) of trimethylaluminum, and the mixture was then reacted at 40° C. for 8 hours.

Afterward, from a solution obtained by removing solid components, toluene was further distilled off under reduced pressure to obtain 6.7 g of a catalytic product (methylaluminoxane). According to a cryoscopic method, the molecular weight of this product was 610. Furthermore, when a high-magnetic field component according to $^1$H-NMR measurement described in Japanese Patent Application Laid-open No. 325391/1987 was measured as a proton nuclear magnetic resonance spectrum in a toluene solution at room temperature, a methyl proton signal based on an "Al—$CH_3$" bond was observed in the range of 1.0 to −0.5 ppm under a tetramethylsilane standard. The proton signal (0 ppm) of tetramethylsilane was present in an observation region of the methyl proton based on the "Al—$CH_3$" bond, and therefore the methyl proton signal based on the "Al—$CH_3$" bond was measured on the basis of the methyl proton signal 2.35 ppm of toluene under the tetramethylsilane standard. The high-magnetic field component (i.e., −0.1 to −0.5 ppm) was separated from the other magnetic field components (i.e., 1.0 to −0.1 ppm), and in this case, the ratio of the high-magnetic field component was 43% of the total components.

Preparation Example 2

Preparation of tri-n-butylammonium tetrakis (pentafluorophenyl)borate

Pentafluorophenyllithium prepared from bromopentafluorobezene (152 mmol) and butyllithium (152 mmol) was reacted with 45 mmol of boron trichloride in hexane to obtain tris(pentafluorophenyl)boron in the state of a white solid. Afterward, 41 mmol of this tris(pentafluorophenyl) boron was reacted with 41 mmol of pentafluorophenyllithium to obtain lithium tetrakis(pentafluorophenyl)boric acid in the state of a white solid.

Next, 16 mmol of lithium tetrakis(pentafluorophenyl) boric acid was reacted with 16 mmols of tri-n-butylammonium hydrochloride in water to obtain 12.8 mmol of tri-n-butylammonium tetrakis(pentafluorophenyl)borate in the state of a white solid.

Preparation Example 3

Preparation of a solid catalytic component

In a 500-ml four-necked flask which had sufficiently been dried was placed 200 ml of dehydrated and purified n-heptane, and 10.0 g (88 mmol) of magnesium diethoxide was then added thereto. Afterward, 1.06 g (17.5 mmol) of isopropyl alcohol was added with stirring, and reaction was then carried out at 80° C. for 1 hour. In succession, the temperature of the reaction system was lowered to room temperature, and the resultant supernatant liquid was then drawn out. Afterward, 150 ml of n-heptane was added, and stirring and drawing were then repeated twice. After washing, 150 ml of n-heptane, 2.63 g (17.5 mmol) of ethyl benzoate and 83 g (440 mmol) of titanium tetrachloride were added, and the solution was heated up to a boiling point, followed by reaction for 2 hours.

After the reaction, the temperature of the solution was lowered to 80° C., and the solution was then allowed to stand and the resultant supernatant liquid was then drawn out. Next, 150 ml of n-heptane was further added, and stirring, standing and liquid drawing were repeated twice, followed by washing. Afterward, 83 g of titanium tetrachloride was added again, and the solution was heated up to a boiling point to carry out reaction. After standing, the supernatant liquid was drawn out, and n-heptane was then added. Next, stirring, standing and liquid drawing were repeated until chlorine ions were not detected any more, followed by washing, to obtain a solid catalytic component.

Ti in the thus obtained solid catalytic component was measured by colorimetric analysis, and as a result, the amount of supported Ti was 48 mg per gram of the carrier.

Example 1

A 1.4-liter autoclave equipped with a stirrer was sufficiently purged with propylene, and 500 ml of amply dehydrated and deoxidized toluene was then placed in the autoclave. In succession, 4 mmols of methylaluminoxane prepared in Preparation Example 1 and 0.01 mmols of bis(indenyl)bis(dimethylsilyl)zirconium dichloride (hereinafter referred to as "the catalyst 1") were then added thereto under a propylene atmosphere. The polymerization of propylene (hereinafter referred to as "the first polymerization") was carried out at 50° C. for 3 hours while the feed of propylene was maintained at 6.0 kg/cm$^2$G, to obtain a block (A) component.

As this point of time, 1/10 of the total component (A) was sampled as an intermediate sample. Next, a gaseous phase portion was released so as to be 0.2 kg/cm$^2$G, and 100 mmols of 2-methyl-1,5-hexadiene was then added. In succession, propylene and ethylene were fed for 1.5 hours at feed rates of 0.180 g/min and 0.25 g/min, respectively, to carry out polymerization (hereinafter referred to as "the second polymerization").

After the polymerization, the gaseous phase portion was released, and a slurry portion was filtered and then dried to obtain 165 g of a powdery block copolymer.

The thus obtained block copolymer having an unsaturated group and its characteristics are shown in Table 1. In this connection, the content of an ethylene unit and the content of a hydrocarbon compound unit having two unsaturated bonds were measured by $^1$H-NMR and $^{13}$C-NMR.

Examples 2 to 6

The same procedure as in Example 1 was repeated except that a polymerization catalyst, the weight ratio between polymers of the first polymerization and the second polymerization and the weight ratio of propylene to ethylene were changed, thereby preparing each copolymer. The results are shown in Table 1.

TABLE 1

|  | Example 1 | Example 2 | Example 3 |
|---|---|---|---|
| Main Catalyst (mmol) | Catalyst 1 (0.01) | Catalyst 2 (0.004) | Catalyst 3 (0.005) |
| Promotor (mmol) | MAO (5.0) | Ammonium (0.004) | MAO (5.0) |
| Unsaturated Hydrocarbon Compound (mmol) | 2-methyl-1,5-hexadiene (100) | 3-methyl-1,5-hexadiene (40) | Dicyclopentadiene (100) |
| Polymerization Temp. (°C.) | 50 | 40 | 40 |
| First Polymerization |  |  |  |
| NMR Area Ratio (%) | 92 | 85 | 89 |
| Melting Point (°C.) | 160 | 156 | 157 |
| Second Polymerization |  |  |  |
| Reaction Ratio of Propylene/Ethylene (wt/wt) | 40/60 | 30/70 | 50/50 |
| Block Copolymer |  |  |  |
| Ethylene Unit Content (wt %) | 4.3 | 8.2 | 3.9 |
| Unsaturated Compound unit Content* (wt %) | 2.0 | 3.2 | 6.2 |
| Peak of Unsaturated Group in IR (cm$^{-1}$) | 1630 | 1630 | 1610 |
| First Polymer/Second Polymer (wt/wt) | 85/15 | 75/25 | 85/15 |
| Reduced Viscosity (dl/g) | 2.05 | 2.51 | 1.95 |
| TUS/DOU | 3.0 | 4.0 | 9.2 |

|  | Example 4 | Example 5 | Example 6 |
|---|---|---|---|
| Main Catalyst (mmol) | Catalyst 1 (0.01) | Catalyst 3 (0.005) | Catalyst 4 (0.01) |
| Promotor (mmol) | Ammonium (0.01) | MAO (5.0) | Triethylaluminum (4.0) |
| Unsaturated Hydrocarbon Compound (mmol) | 5-vinylnorbornene (60) | 3-butenylstyrene (30) | 3-butenylstyrene (16) |
| Polymerization Temp. (°C.) | 50 | 50 | 50 |
| First Polymerization |  |  |  |
| NMR Area Ratio (%) | 91 | 90 | 97 |
| Melting Point (°C.) | 158 | 159 | 162 |
| Second Polymerization |  |  |  |
| Reaction Ratio of Propylene/Ethylene (wt/wt) | 55/45 | 40/60 | 40/60 |

TABLE 1-continued

| Block Copolymer |  |  |  |
|---|---|---|---|
| Ethylene Unit Content (wt %) | 2.1 | 5.0 | 3.1 |
| Unsaturated Compound Unit Content* (wt %) | 3.6 | 2.4 | 1.8 |
| Peak of Unsaturated Group in IR (cm$^{-1}$) | 1630 | 1630 | 1640 |
| First Polymer/Second Polymer (wt/wt) | 85/15 | 80/20 | 85/15 |
| Reduced Viscosity (dl/g) | 2.27 | 1.84 | 2.80 |
| TUS/DOU | 8.6 | 10.0 | 12.5 |

*The content of a compound unit having two unsaturated bonds.

(Notes)
Catalyst 1: Bis(indenyl)bis(dimethylsilyl)zirconium dichloride
Catalyst 2: Indenyl(cyclopentadienyl)(dimethylsilyl)zirconium dichloride
Catalyst 3: Dimethylsilylenebis(2,4-dimethylcyclopentadienyl)zirconium dichloride
Catalyst 4: A solid catalyst prepared in Preparation Example 3
MAO: Methylaluminoxane prepared in Preparation Example 1 (1/5 mol of triisobutylaluminum was used together)
Ammonium: Tri-n-butylammonium tetrakis(pentafluorophenyl)borate prepared in Preparation Example 2 (0.3 mmol of triisobutylaluminum was used together)
Propylene pressure (first polymerization): 6.0 kg/cm$^2$G Example 7

A 1.4-liter autoclave equipped with a stirrer was sufficiently purged with propylene, and 500 ml of dehydrated and deoxidized toluene, 4 mmol of norbornadiene, 4.0 mmol of triisobutylaluminum and 5.0 mmol of methylaluminoxane obtained in Preparation Example 1 were then placed in the autoclave. In succession, 0.01 mmol of a catalyst was further added thereto, and the solution was then warmed up to 40° C. Next, propylene was fed thereto under a constant pressure of 6.0 kg/cm$^2$G and polymerization was carried out for 60 minutes, thereby obtaining 180 g of a copolymer (A).

As this point of time, 1/10 of the total copolymer (A) was sampled as an intermediate sample. Next, a gaseous phase portion was released so as to be 0.2 kg/cm$^2$G, and propylene and ethylene were fed at feed rates of 0.32 g/min and 0.11 g/min, respectively, and polymerization was carried out for 90 minutes. After the polymerization, the same procedure as in Example 1 was carried out to obtain 240 g of a propylene block copolymer.

The characteristics of the thus obtained propylene block copolymer [1] are shown in Table 2. In this connection, the content of an ethylene unit and the content of a hydrocarbon compound unit having two unsaturated bonds were measured by $^1$H-NMR and $^{13}$C-NMR.

Example 8

The same procedure as in Example 7-(1) was repeated except that the addition of 4 mmol of norbornadiene was done after sampling and the release of a gaseous phase portion to 0.2 kg/cm$^2$G and the reaction ratio of propylene/ethylene in the second polymerization was changed as shown in Table 2, thereby obtaining 220 g of a propylene block copolymer [1].

The characteristics of the thus obtained propylene block copolymer [1] are shown in Table 2.

Example 9

The same procedure as in Example 7-(1) was repeated except that 2.4 mmol of norbornadiene was added at the time of the start of polymerization and 1.6 mmol of norbornadiene was added after the release of a gaseous phase portion and the reaction ratio of propylene/ethylene in the second polymerization was changed as shown in Table 2, thereby obtaining 170 g of a propylene block copolymer [1].

The characteristics of the thus obtained propylene block copolymer [1] and a graft copolymer [2] are shown in Table 2.

Comparative Example 1

The same procedure as in Example 7 was repeated except that polymerization was carried out without adding no norbornadiene, thereby obtaining 200 g of a propylene block copolymer. The characteristics of this block copolymer are shown in Table 2.

TABLE 2

|  | Example 7 | Example 8 |
|---|---|---|
| Block copolymer | | |
| Main Catalyst (mmol) | Catalyst 3 (0.01) | Catalyst 3 (0.005) |
| Promotor (mmol) | MAO (5.0) | MAO (5.0) |
| Unsaturated Hydrocarbon Compound (mmol) | Norbornadiene (4) | Norbornadiene (4) |
| Polymerization Temp. (°C.) | 40 | 40 |
| First Polymerization | | |
| NMR Area Ratio | 89 | 92 |
| Melting Point (°C.) | 152 | 160 |
| Second Polymerization | | |
| Reaction Ratio of Propylene/Ethylene (wt/wt) | 75/25 | 70/30 |
| Ethylene unit Content (wt %) | 4.2 | 4.0 |
| Unsaturated Compound Unit Content* (wt %) | 1.44 | 1.20 |
| Peak of Unsaturated Group in IR (cm$^{-1}$) | 963 | 963 |
| First Polymer/ Second Polymer (wt/wt) | 85/15 | 85/15 |
| Reduced viscosity (dl/g) | 1.08 | 1.92 |
| TUS/DOU | 5.6 | 6.2 |
| Activation energy of melt flow (Ea)(kcal/mol) | 12.5 | 12.2 |

|  | Example 9 | Comp. Ex. 1 |
|---|---|---|
| Block Copolymer | | |
| Main Catalyst (mmol) | Catalyst 3 (0.91) | Catalyst 3 (0.91) |
| Promotor (mmol) | MAO (5.0) | MAO (5.0) |
| Unsaturated Hydrocarbon Compound (mmol) | Norbornadiene (4) | — |
| Polymerization Temp. (°C.) | 40 | 40 |
| First polymerization | | |
| NMR Area Ratio (%) | 86 | 94 |
| Melting Point (°C.) | 145 | 161 |

TABLE 2-continued

|  | | |
|---|---|---|
| Second Polymerization | | |
| Reaction Ratio of Propylene/Ethylene (wt/wt) | 65/35 | 75/25 |
| Ethylene Unit Content (wt %) | 4.3 | 4.3 |
| Unsaturated Compound Unit Content* (wt %) | 1.36 | — |
| Peak of Unsaturated Group in IR (cm$^{-1}$) | 963 | — |
| First Polymer/ Second Polymer (wt/wt) | 85/15 | 85/15 |
| Reduced viscosity (dl/g) | 2.43 | 1.25 |
| TUS/DOU | 6.0 | — |
| Activation energy of melt flow (Ea)(kcal/mol) | — | 7.1 |

*The content of a compound unit having two unsaturated bonds.

(Notes)
Catalyst 3 and MAO are the same as in the footnote of Table 1.
Propylene pressure (first polymerization): 6 kg/cm$^2$G

Example 10

The propylene block copolymer obtained in Example 1 was hydrogenated under conditions of a temperature of 140° C., a copolymer concentration of 9 wt %, a hydrogen partial pressure of 30 kg/cm$^2$G, a carbon-supporting ruthenium catalyst (Ru content=5 wt %) concentration of 4 wt % and a reaction time of 6 hours in a decalin solvent, and the copolymer was then isolated from the reaction solution.

The activation energy (Ea) of melt flow of this hydrogenated block copolymer was 10.9 kcal/mol.

Furthermore, a pressed sheet having a thickness of 300 μm was formed from this block copolymer, and its infrared absorption spectrum was then measured. As a result, any absorption of unsaturated groups present in the range of 800 to 1,640 cm$^{-1}$ was not observed.

Example 11

A hydrogenation treatment was carried out by the same procedure as in Example 10 except that a propylene graft copolymer obtained in Example 7 was used.

The activation energy (Ea) of melt flow of this hydrogenated block copolymer was 12.8 kcal/mol.

Furthermore, a pressed sheet having a thickness of 300 μm was formed from this block copolymer, and its infrared absorption spectrum was then measured. As a result, any absorption of unsaturated groups present in the range of 800 to 1,640 cm$^{-1}$ was not observed.

Example 12 (Introduction of hydroxyl groups)

5.0 g of a resin obtained in Example 1 was dissolved in 200 ml of toluene at 120° C., and an agent previously obtained by mixing and stirring 10 g of 90 wt % formic acid and 1.5 g of 30 wt % aqueous hydrogen peroxide was then added dropwise over 1 hour and a heat treatment was further made at 110° C. for 1 hour. Next, the solution was neutralized with methanol containing dissolved sodium hydroxide, and then poured into a large amount of acetone to precipitate a polymer. Afterward, the thus precipitated polymer was sufficiently washed, and then dried under reduced pressure to obtain a modified polymer.

According to an infrared spectrophotometry method (an IR method), a peak at 1630 cm$^{-1}$, which was first observed, substantially disappeared, and another wide peak newly appeared in the vicinity of 3,300 cm$^{-1}$. The conversion, into the hydroxy groups, of unsaturated bonds in the resin measured by an NMR method was about 100 mol %.

Example 13 (Introduction of carboxyl groups)

3.0 g of a resin obtained in Example 2 was dissolved in 200 ml of toluene at 120° C., and to this solution was added a mixture of 10 g of acetic acid, 1.8 g of paraformaldehyde and 1 ml of 98 wt % concentrated sulfuric acid. Next, the solution was refluxed for 3 hours, while vigorously stirred. After the completion of the reaction, the solution was neutralized with methanol containing dissolved sodium hydroxide, and then poured into a large amount of acetone to precipitate a polymer. Afterward, the thus precipitated polymer was sufficiently washed, and then dried under reduced pressure to obtain a modified polymer.

According to an IR method, a peak at 1,630 cm$^{-1}$ disappeared, and another sharp peak was newly observed in the vicinity of 1,700 cm$^{-1}$.

The conversion of unsaturated bonds in the resin into the hydroxy groups was about 100 mol %.

Example 14 (Introduction of epoxy groups)

5.0 g of a resin obtained in Example 3 was dissolved in 200 ml of toluene at 120° C., and 0.2 g of t-butyl hydroperoxide and 15 mg of hexacarbonylmolybdenum were added to this solution, followed by reflux for 2 hours. Next, the solution was poured into a large amount of cold methanol to precipitate a polymer, and the thus precipitated polymer was washed, and then dried under reduced pressure to obtain a modified polymer.

According to an IR method, a peak in the vicinity of 1,610 cm$^{-1}$ disappeared, and a peak peculiar to the epoxy group was newly observed at 3,040 cm$^{-1}$, by which it was confirmed that the epoxy groups were introduced. The conversion of unsaturated bonds in the resin into the epoxy groups was about 92 mol %.

Example 15 (Introduction of nitro groups)

10.0 g of a resin obtained in Example 4 was mixed with 200 ml of toluene, 10 ml of 98 wt % concentrated sulfuric acid and 10 ml of 67 wt % nitric acid, and reaction was then carried out at.80° C. for 10 minutes with stirring. After the completion of the reaction, the solution was neutralized with methanol containing dissolved sodium hydroxide, sufficiently washed, and then dried under reduced pressure to obtain a modified polymer.

According to an IR method, a characteristic peak at 1,630 cm$^{-1}$ disappeared, and sharp peaks attributable to the presence of the nitro groups were observed in the vicinity of 1,560 cm$^{-1}$ and 1,350 cm$^{-1}$. The conversion of unsaturated bonds in the resin into the nitro groups was about 100 mol %.

Example 16 (Introduction of amino groups)

5.0 g of a nitrated copolymer obtained in Example 15 was mixed with 200 ml of toluene, 6 g of stannous chloride and 30 g of concentrated sulfuric acid, and reaction was then carried out at 80° C. for 3 hours with stirring. After the completion of the reaction, the solution was neutralized with methanol containing dissolved sodium hydroxide, sufficiently washed, and then dried under reduced pressure to obtain a modified polymer.

According to an IR method, peaks peculiar to nitro groups at 1,560 cm$^{-1}$ and 1,350 cm$^{-1}$ disappeared, and a broad peak attributable to the amino group appeared at 3,400 cm$^{-1}$ to 3,500 cm$^{-1}$.

Example 17 (Introduction of sulfone groups)

5.0 g of a resin obtained in Example 5 was mixed with 20 g of tetrachloroethane and 100 ml of toluene, and the solution was then heated at 60° C. for 30 minutes. Afterward, the system was cooled, and 4.0 g of chlorosulfonic acid was added over 6 hours with stirring. Next, glacial acetic acid was added thereto until any hydrogen chloride was not generated any more, and the resultant reaction product was poured into a large amount of water. After decantation, the reaction product was poured into water again. This operation was repeated several times to sufficiently wash the product, and this product was further washed with acetone to remove tetrachloroethane, and then dried under reduced pressure to obtain a desired modified polymer. According to an IR method, there were confirmed the disappearance of a peak at 1,630 cm$^{-1}$ and the appearance of peaks in the vicinity of 1,070 cm$^{-1}$ and 650 cm$^{-1}$ attributable to the introduction of the sulfone groups. The conversion of unsaturated bonds in the resin into the sulfone groups was about 100 mol %.

Example 18 (Acylation)

5.0 g of a resin obtained in Example 6 was slowly added to a liquid mixture obtained by sufficiently stirring 10 g of anhydrous aluminum chloride, 8 g of acetyl chloride and 200 ml of carbon disulfide. After the addition, the solution was further stirred for 15 minutes, and the contents were poured into methanol containing hydrochloric acid to remove aluminum chloride, sufficiently washed with dilute hydrochloric acid, water and an alcohol, and then dried under reduced pressure to obtain a modified polymer.

According to an IR method, a peak at 1,640 cm$^{-1}$ disappeared, and peaks attributable to the introduction of the acetyl groups were observed in the vicinity of 1,800 cm$^{-1}$ and 1,100 cm$^{-1}$. The conversion of unsaturated bonds in the resin was about 100 mol %.

Example 19 (Introduction of halogens)

5.0 g of a resin obtained in Example 5 and 300 ml of carbon tetrachloride were heated up to 50° C. in a nitrogen atmosphere, and then stirred so as to become a suspension state. Afterward, 20 g of bromine was poured thereto, and reaction was then continued for 30 minutes. After the completion of the reaction, the contents were poured into a large amount methanol to precipitate the resultant product. Next, this product was sufficiently washed, and then dried under reduced pressure to obtain a modified polymer.

According to an IR method, the disappearance of a peak at 1,630 cm$^{-1}$ was confirmed, and according to ion chromatography, a bromine content was 21.4 wt %.

Text Example 1

The respective modified copolymers obtained in Examples 12, 13, 14, 15, 16, 17 and 18 as well as the precursor of the modified copolymer obtained in Example 3 were molten and pressed to form pressed sheets having a size of 40 mm×40 mm and a thickness of 0.1 mm. Next, distilled water was dropped on the central position of each pressed sheet, and the shape of the drop was measured by the use of a liquid drop shape method. The observation was carried out by the naked eye. The results are shown in Table 3.

| Kind of Resin | Observation of Liquid Drop Shape |
| --- | --- |
| Example 12 | Any liquid drop was not formed, and the liquid slowly spread on the sheet. |
| Example 13 | Any liquid drop was not formed, and the liquid slowly spread on the sheet. |
| Example 14 | Any liquid drop was not formed, and the liquid slowly spread on the sheet. |
| Example 15 | Any liquid drop was not formed. |
| Example 16 | Any liquid drop was not formed, and the liquid slowly spread on the sheet. |

-continued

| Kind of Resin | Observation of Liquid Drop Shape |
|---|---|
| Example 17 | Any liquid drop was not formed. |
| Example 18 | Any liquid drop was not formed, and the liquid slowly spread on the sheet. |
| Example 3 | The liquid drop was formed, and the liquid did not spread on the sheet. |

Possibility of Industrial Utilization

A propylene block copolymer of the present invention has reactive unsaturated groups, can inhibit the generation of a gel by a crosslinking reaction or a cyclizing reaction, is excellent in balance between stiffness and impact resistance, can optionally control melt tension and the activation energy of melt flow, has a good moldability.

A hydrogenated propylene block copolymer regarding the present invention can maintain the characteristics of the unhydrogenated propylene block copolymer and is excellent in thermal stability.

On the other hand, a modified copolymer regarding the present invention, in which a functional group such as a hydroxyl group, a carboxyl group, an epoxy group, a nitro group, an amino group, an acyl group, a sulfone group or a halogen group is introduced into the unsaturated group of the above-mentioned propylene block copolymer, is excellent in adhesive properties, printability, hydrophilic nature, polymer modifying properties, antistatic properties and flame resistance. Thus, the modified copolymer can suitably be used in various applications.

We claim:

1. A propylene block copolymer comprising: (A) 50 to 95 wt % of a propylene polymer block which contains units derived from propylene or units derived from propylene and 4 wt % or less of an olefin having 2 to 8 carbon atoms and in which the peak area of a peak observed between 21.0 and 22.0 ppm is 75 wt % or more of the peak area of peaks observed between 19.5 and 22.5 ppm attributable to a methyl group present on a side chain of a propylene chain by the use of tetramethylsilane as an internal standard in 1,2,4-trichlorobenzene in $^{13}$C-NMR measurement, and (B) 50 to 5wt % of an ethylenepropylene copolymer block containing 20 to 90 wt % of units derived from ethylene, a unit derived from a hydrocarbon compound having two unsaturated bonds being contained in a ratio of 0.001 to 15.0 wt % of said copolymer in at least one of (A) and (B), a reduced viscosity of said copolymer at a concentration of 0.05 g/dl measured in decahydronaphthalene at a temperature of 135° C. being in the range of 0.01 to 30 dl/g.

2. The propylene block copolymer according to claim 1 wherein the hydrocarbon compound having two unsaturated bonds is at least one selected from the group consisting of (a) a straight-chain non-conjugated diene compound represented by the following formula (I)

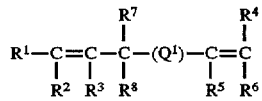

(I)

(wherein $R^1$ to $R^8$ are each a hydrogen atom or an alkyl group having 1 to 8 carbon atoms, and are the same or different from each other, and $Q^1$ is an divalent hydrocarbon group having 1 to 20 carbon atoms), (b) an aromatic diolefin compound represented by the following formula (II)

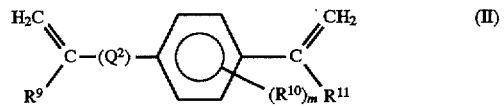

(II)

(wherein $R^9$ $R^{10}$ and $R^{11}$ are each a hydrogen atom, a halogen atom or an alkyl group having 1 to 8 carbon atoms, and are the same as or different from each other, $Q^2$ is an divalent hydrocarbon group having 1 to 20 carbon atoms, and m is an integer of 1 to 4), and (c) a cyclic polyene having a norbornene skeleton represented by formula (III), (IV) or (V)

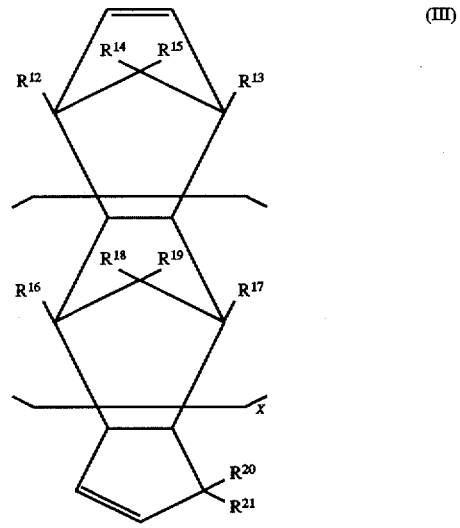

(III)

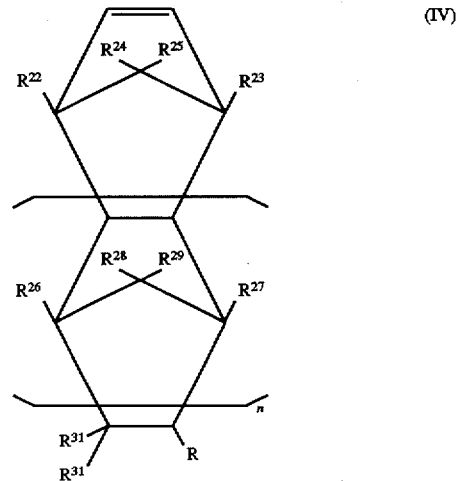

(IV)

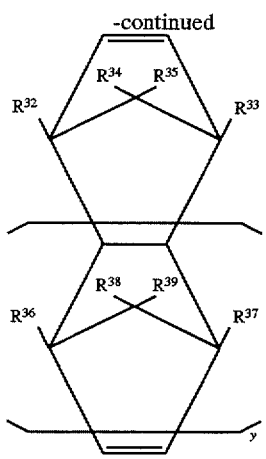

(V)

(wherein $R^{12}$ to $R^{39}$ are each a hydrogen atom, a halogen atom or a hydrocarbon group having 1 to 20 carbon atoms, and the respective groups of $R^{12}$ to $R^{21}$, $R^{22}$ to $R^{31}$, and $R^{32}$ to $R^{39}$ are the same as or different from each other, R is an alkenyl group or an alkylidene group, and x, n and y are each an integer of 0 or more), and the relation between the content of the unit derived from a hydrocarbon compound having two unsaturated bonds (DOU mol %) and the total amount of unsaturated groups observed in the copolymer (TUS mol %) meets the equation $$0.001 \leq TUS/DOU \leq 200.$$

3. A propylene block copolymer substantially not having the remaining unsaturated groups which is obtained by subjecting the propylene block copolymer described in claim 1 to a hydrogenation treatment.

4. The propylene block copolymer according to claim 1 wherein the activation energy (Ea) of melt flow is in the range of 8.0 to 25.0 kcal/mol.

5. A process for preparing the propylene block copolymer described in claim 2 which comprises using a polymerization catalyst comprising a transition metal compound and a compound capable of reacting with the transition metal compound to form an ionic complex.

6. A process for preparing the propylene block copolymer described in claim 2 which comprises the steps of carrying out the homopolymerization of propylene or the random copolymerization of propylene and an olefin having 2 to 8 carbon atoms until the amount of the resultant polymer is in the range of 50 to 90 wt % of the total block copolymer, and then doing the random copolymerization of propylene, hydrocarbon compound having two unsaturated bonds of at least one kind selected from compounds represented by the formulae (I) to (V), and ethylene.

7. A process for preparing the propylene block copolymer described in claim 2 which comprises the steps of carrying out the random copolymerization of propylene and a hydrocarbon compound having two unsaturated bonds of at least one kind selected from the group consisting of compounds represented by the formulae (I) to (V), or the random copolymerization of propylene, an olefin having 2 to 8 carbon atoms and a hydrocarbon compound having two unsaturated bonds of at least one kind selected from the group consisting of compounds represented by the above-mentioned formulae (I) to (V) until the amount of the resultant random copolymer is in the range of 50 to 90 wt % of the total block copolymer, and then doing the random copolymerization of ethylene and propylene in the presence of the propylene copolymer.

8. A process for preparing the propylene block copolymer described in claim 2 which comprises the steps of carrying out the random copolymerization of propylene and a hydrocarbon compound having two unsaturated bonds of at least one kind selected from the group consisting of compounds represented by the formulae (I) to (V), or the random copolymerization of propylene, an olefin having 2 to 8 carbon atoms and a hydrocarbon compound having two unsaturated bonds of at least one kind selected from the group consisting of compounds represented by the formulae (I) to (V) until the amount of the resultant random copolymer is in the range of 50 to 90 wt % of the total block copolymer, and then doing the random copolymerization of propylene, ethylene and a hydrocarbon compound having two unsaturated bonds of at least one kind selected from the group consisting of compounds represented by the above-mentioned formulae (I) to (V) in the presence of the propylene copolymer.

9. A process for preparing a propylene block copolymer which comprises hydrogenating the propylene block copolymer obtained by the process described in claim 5 in the presence of a hydrogenation catalyst.

10. A modified copolymer which is obtained by introducing a functional group to at least 5 mol % of unsaturated bonds present in the propylene block copolymer described in claim 1.

11. A propylene block copolymer substantially not having the remaining unsaturated groups which is obtained by subjecting the propylene block copolymer described in claim 2 to a hydrogenation treatment.

12. The propylene block copolymer according to claim 2 wherein the activation energy (Ea) of melt flow is in the range of 8.0 to 25.0 kcal/mol.

13. The propylene block copolymer according to claim 3 wherein the activation energy (Ea) of melt flow is in the range of 8.0 to 25.0 kcal/mol.

14. The propylene block copolymer according to claim 11 wherein the activation energy (Ea) of melt flow is in the range of 8.0 to 25.0 kcal/mol.

15. A process for preparing the propylene block copolymer described in claim 2 which comprises using a polymerization catalyst mainly comprising a transition metal compound and a compound capable of reacting with the transition metal compound or its derivative to form an ionic complex.

16. A process for preparing a propylene block copolymer which comprises hydrogenating the propylene block copolymer obtained by the process described in claim 6 in the presence of a hydrogenation catalyst.

17. A process for preparing a propylene block copolymer which comprises hydrogenating the propylene block copolymer obtained by the process described in claim 7 in the presence of a hydrogenation catalyst.

18. A process for preparing a propylene block copolymer which comprises hydrogenating the propylene block copolymer obtained by the process described in claim 8 in the presence of a hydrogenation catalyst.

19. A process for preparing a propylene block copolymer which comprises hydrogenating the propylene block copolymer obtained by the process described in claim 14 in the presence of a hydrogenation catalyst.

20. A modified copolymer which is obtained by introducing a functional group to at least 5 mol % of unsaturated bonds present in the propylene block copolymer described in claim 2.

* * * * *